United States Patent
Yasukawa

(10) Patent No.: US 6,697,136 B1
(45) Date of Patent: Feb. 24, 2004

(54) LIQUID CRYSTAL DEVICE, PROJECTOR, AND METHOD OF MANUFACTURING THE LIQUID CRYSTAL DEVICE

(75) Inventor: Masahiro Yasukawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 379 days.

(21) Appl. No.: 09/670,039

(22) Filed: Sep. 26, 2000

(30) Foreign Application Priority Data

Sep. 29, 1999 (JP) .......................................... 11-277222
Jul. 31, 2000 (JP) ........................................ 2000-232494

(51) Int. Cl.⁷ ................................................. G02F 1/13
(52) U.S. Cl. ..................................... 349/113; 349/122
(58) Field of Search ................................ 349/113, 122, 349/43

(56) References Cited

U.S. PATENT DOCUMENTS

| | | | | |
|---|---|---|---|---|
| 5,182,620 A | * | 1/1993 | Shimada et al. ............... | 257/72 |
| 6,108,056 A | * | 8/2000 | Nakajima et al. .............. | 349/38 |
| 6,219,118 B1 | * | 4/2001 | Zhang ......................... | 349/110 |
| 6,266,110 B1 | * | 7/2001 | Mizuno et al. .............. | 349/111 |
| 6,400,434 B1 | * | 6/2002 | Fukunaga ................... | 349/138 |
| 6,437,842 B1 | * | 8/2002 | Sato et al. .................. | 349/110 |

FOREIGN PATENT DOCUMENTS

KR 0179135 11/1998

* cited by examiner

Primary Examiner—James Dudek
(74) Attorney, Agent, or Firm—Oliff & Berridge, PLC

(57) ABSTRACT

To prevent the occurrence of display defects due to a transverse electric field produced between pixel electrodes in a liquid crystal device having a planarized interlayer insulating film, to permit high-quality image display, a liquid crystal device includes a counter substrate, a TFT array substrate on which a plurality of pixel electrodes are arranged in a matrix, and a liquid crystal layer held between both substrates. The TFT array substrate includes a semiconductor layer, a gate insulating film, scanning lines, capacitance lines, a planarized interlayer insulating film, an interlayer insulating film, and pixel electrodes, all of which are laminated in turn on a substrate. A pattern film is arranged between the interlayer insulating films and corresponding to the vicinities of the regions between the adjacent pixel electrodes. The pattern film is arranged to provide steps in the surface of the side of the TFT array substrate, which contact the liquid crystal layer, thereby preventing the occurrence of orientation defects of liquid crystal molecules due to the transverse electric field produced between the adjacent pixel electrodes.

30 Claims, 15 Drawing Sheets

[FIG. 1]
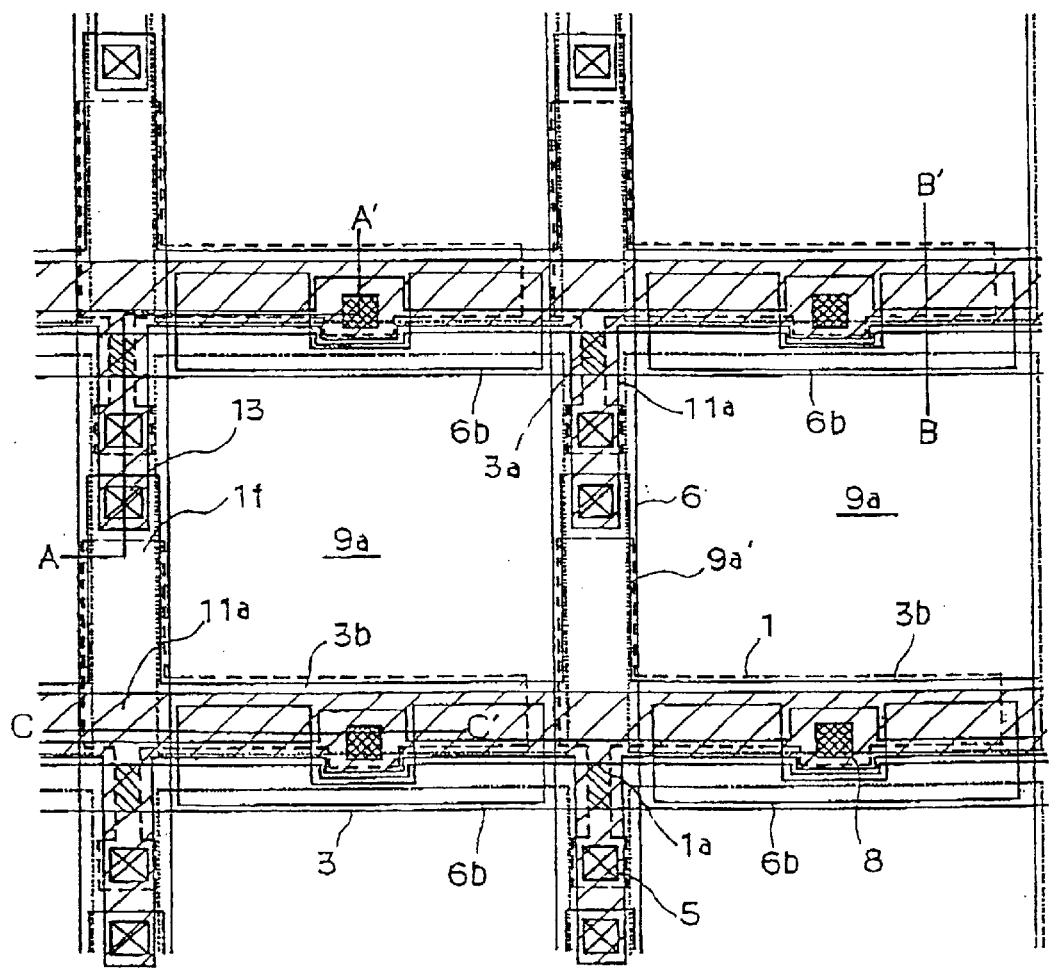

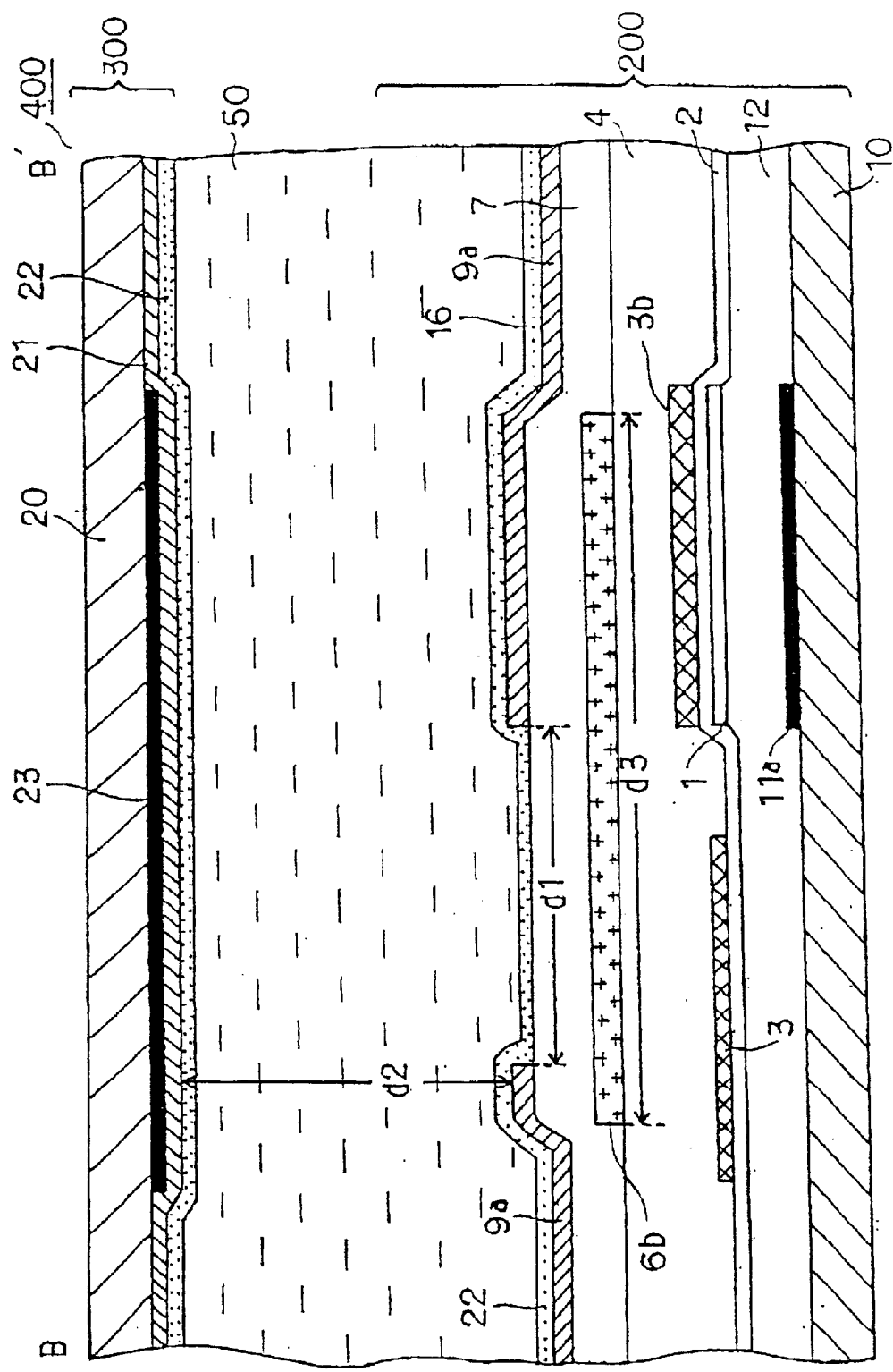
[FIG. 2]

[FIG. 3]
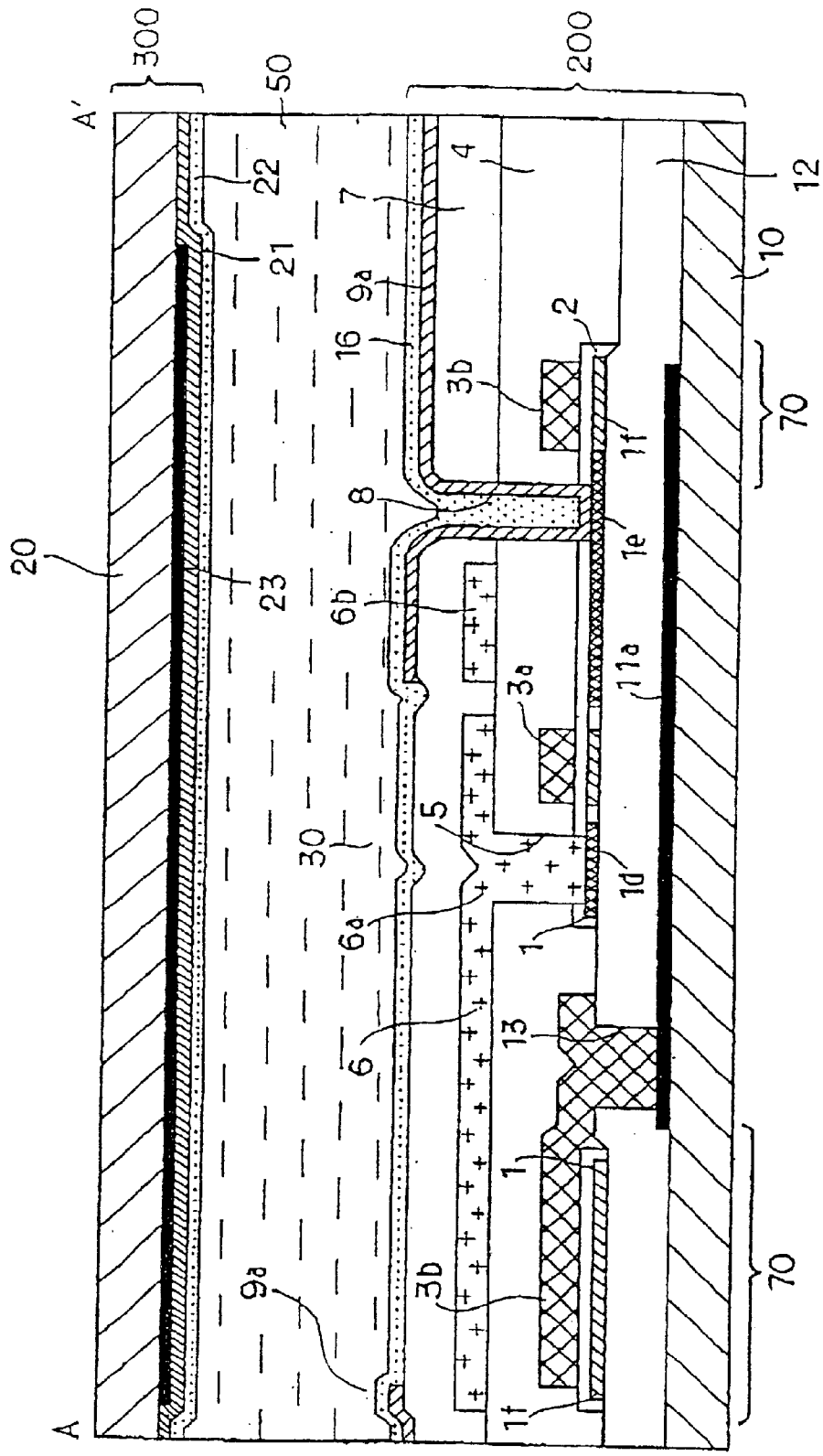

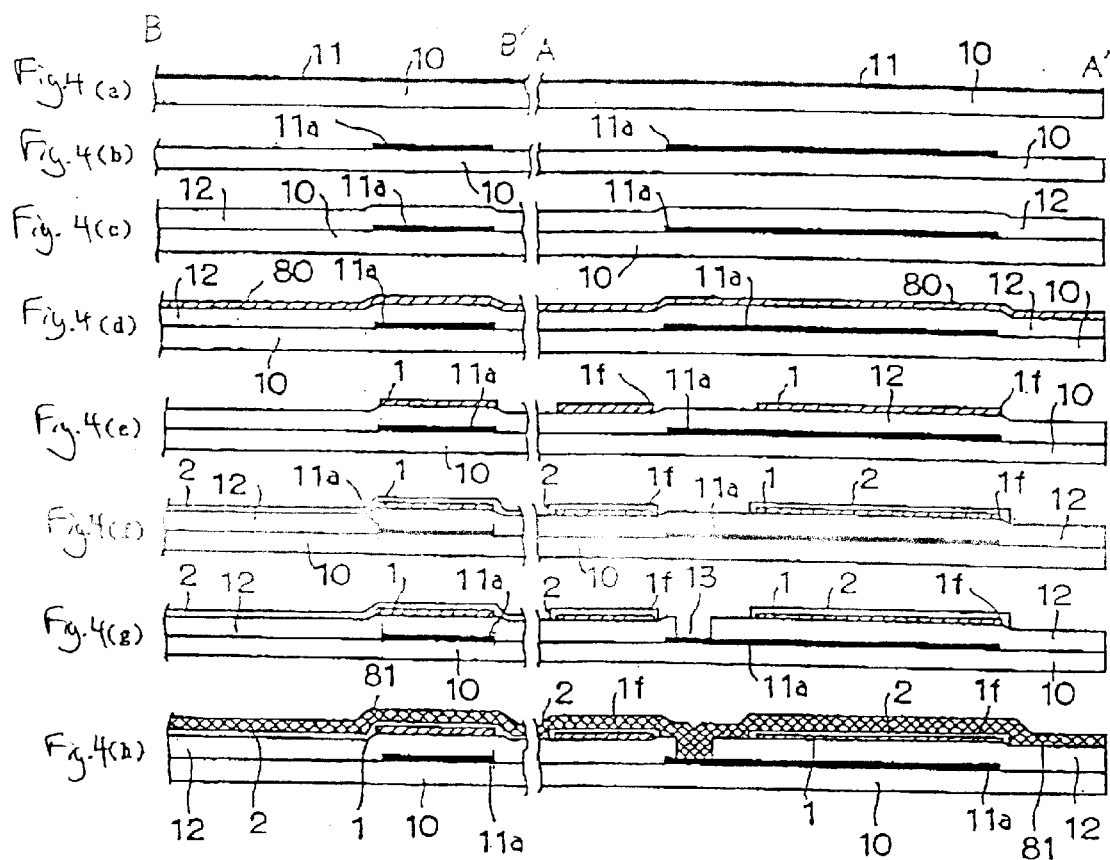

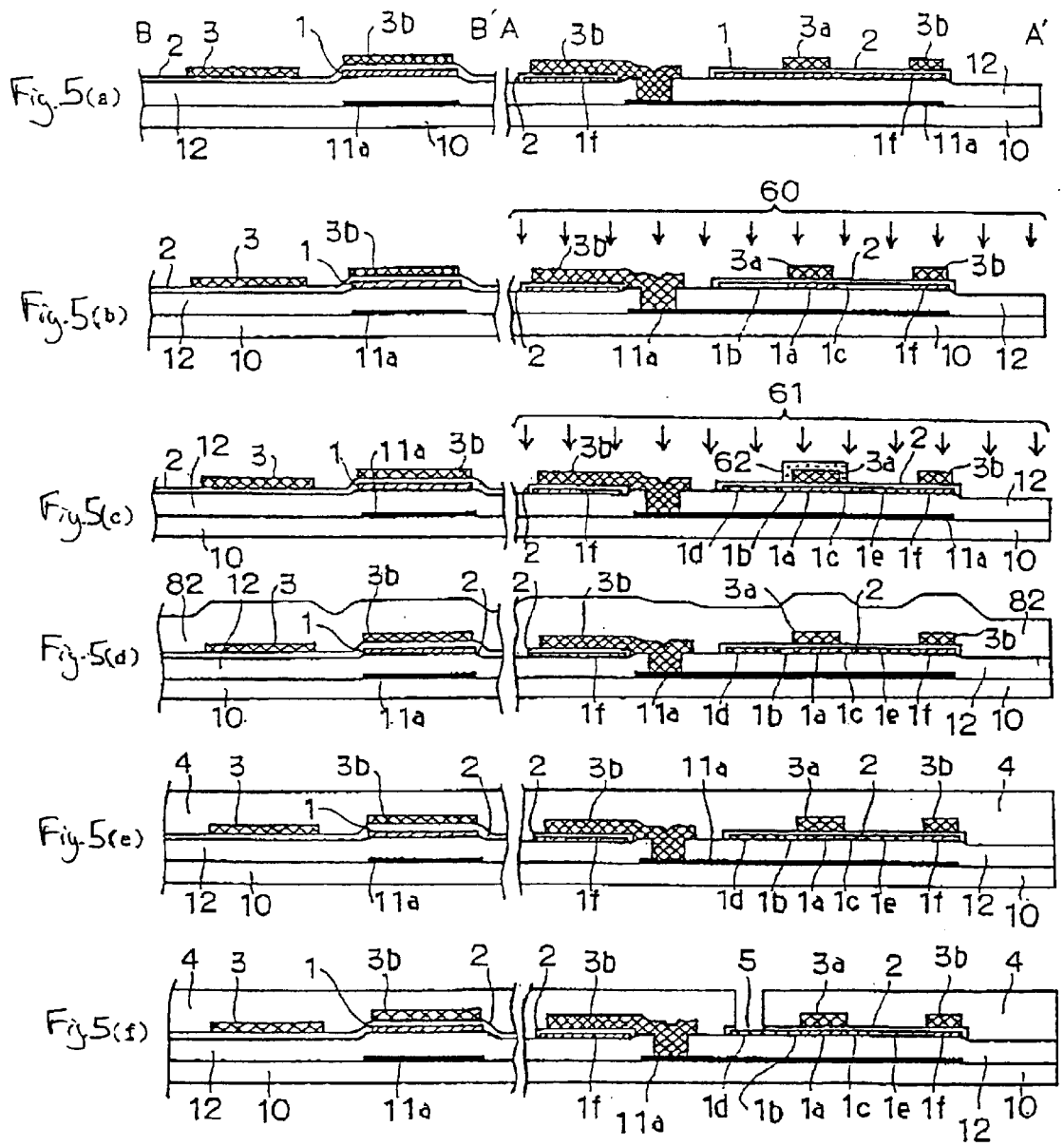

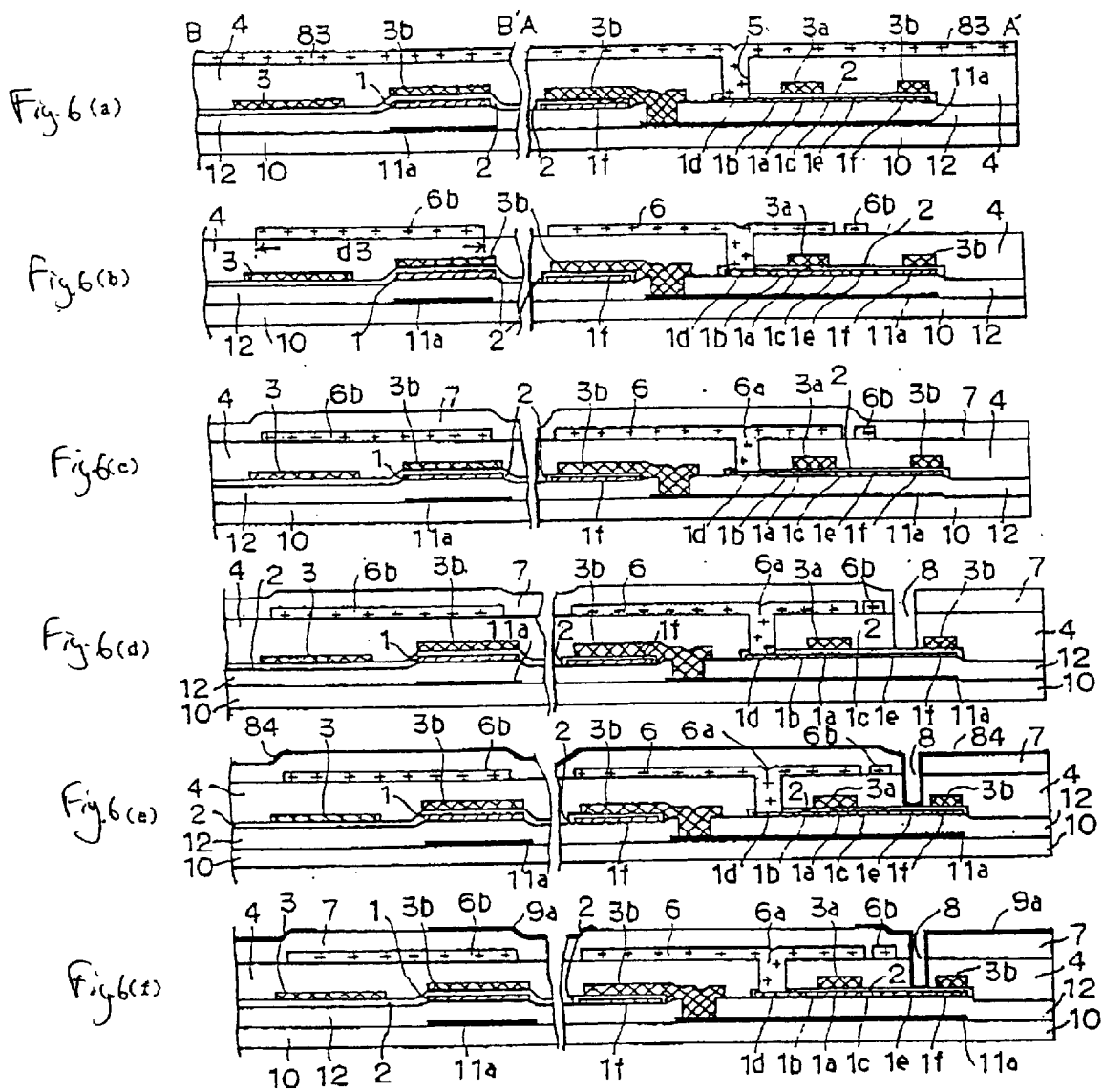

[FIG. 7]
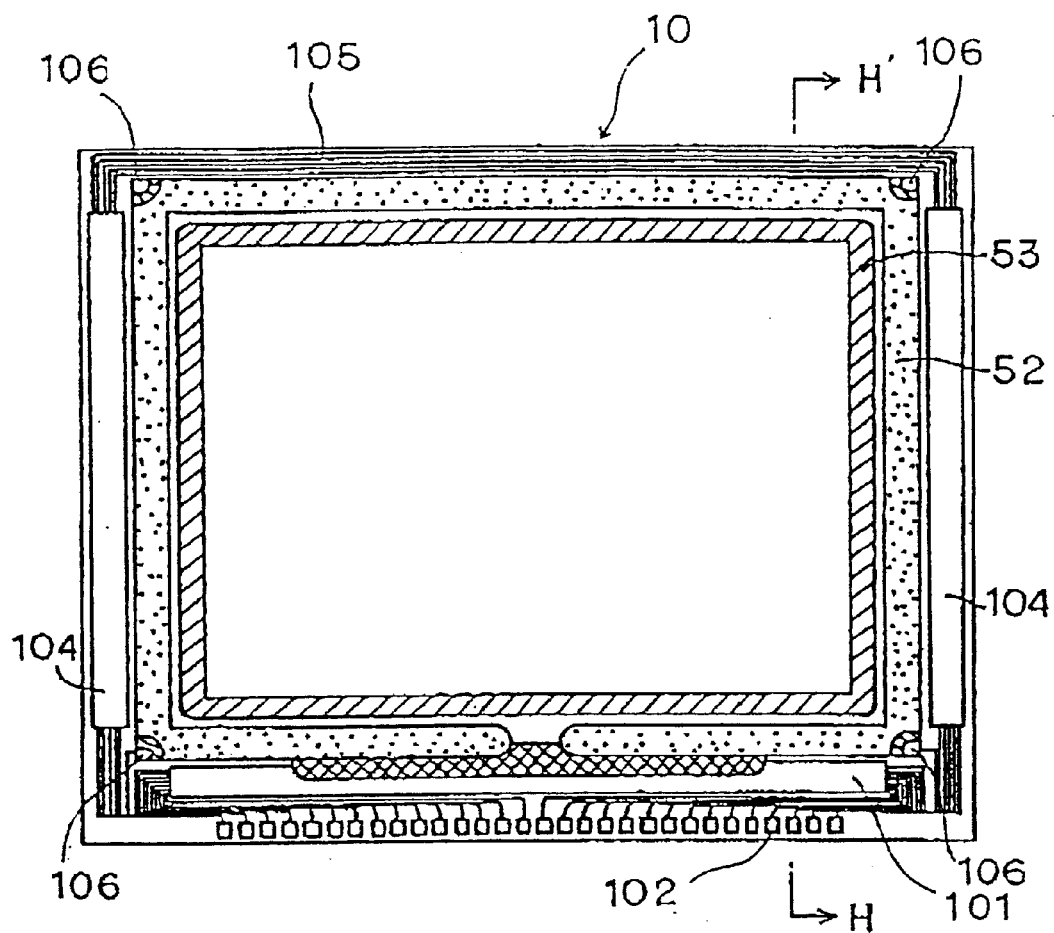
[FIG. 8]
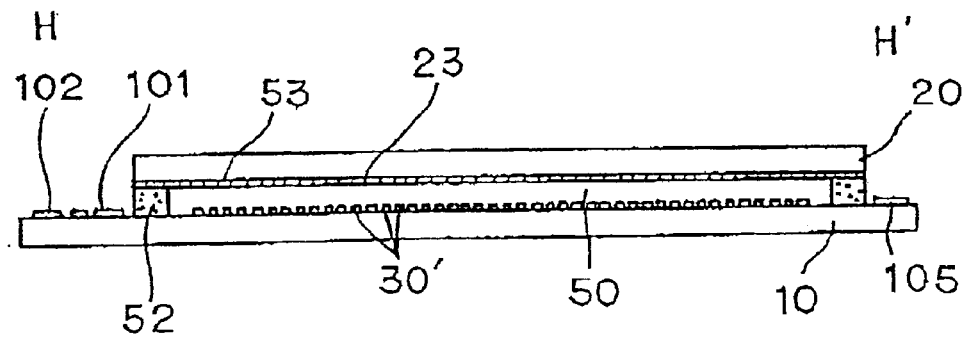

[FIG. 9]
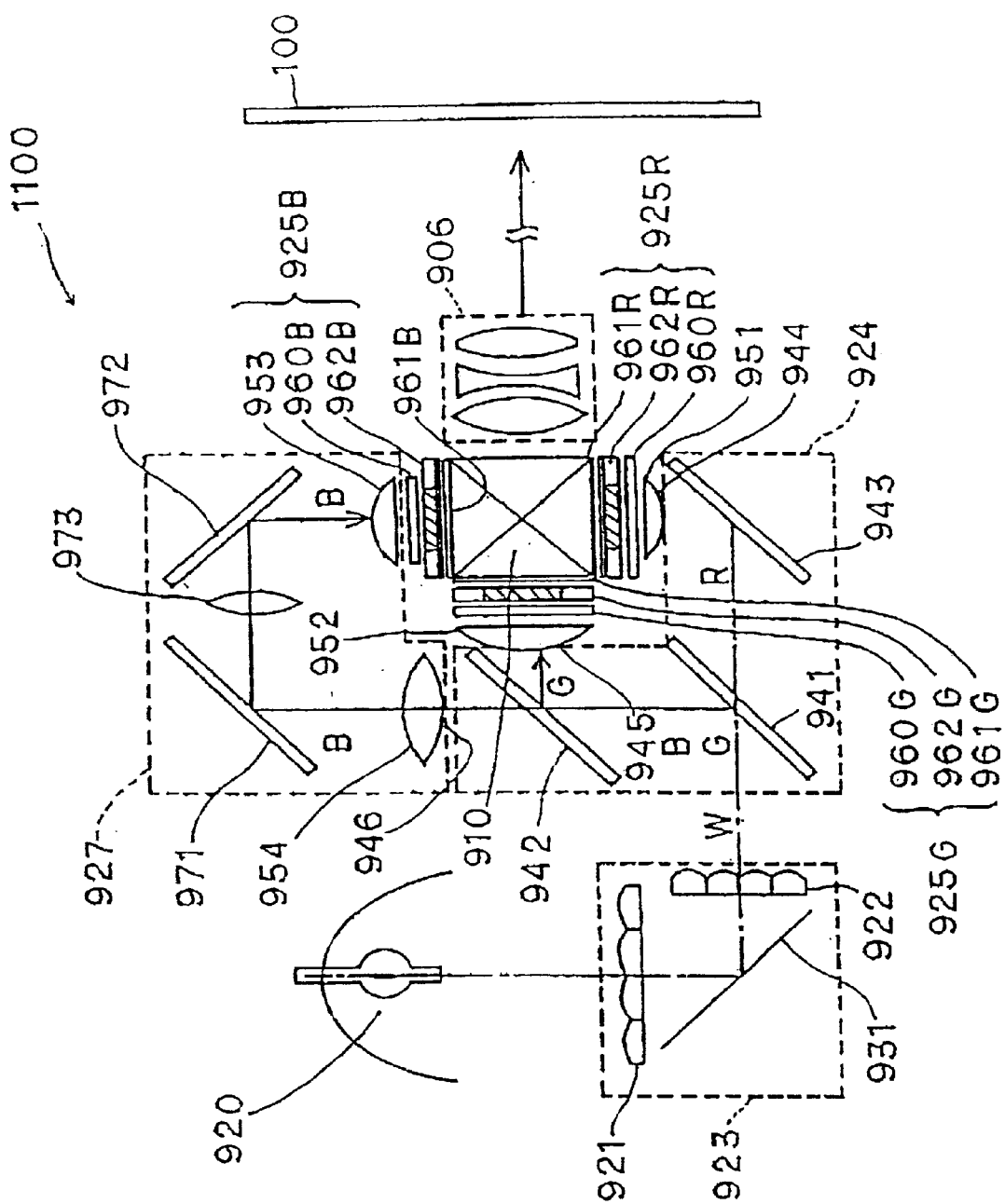

[FIG. 10]
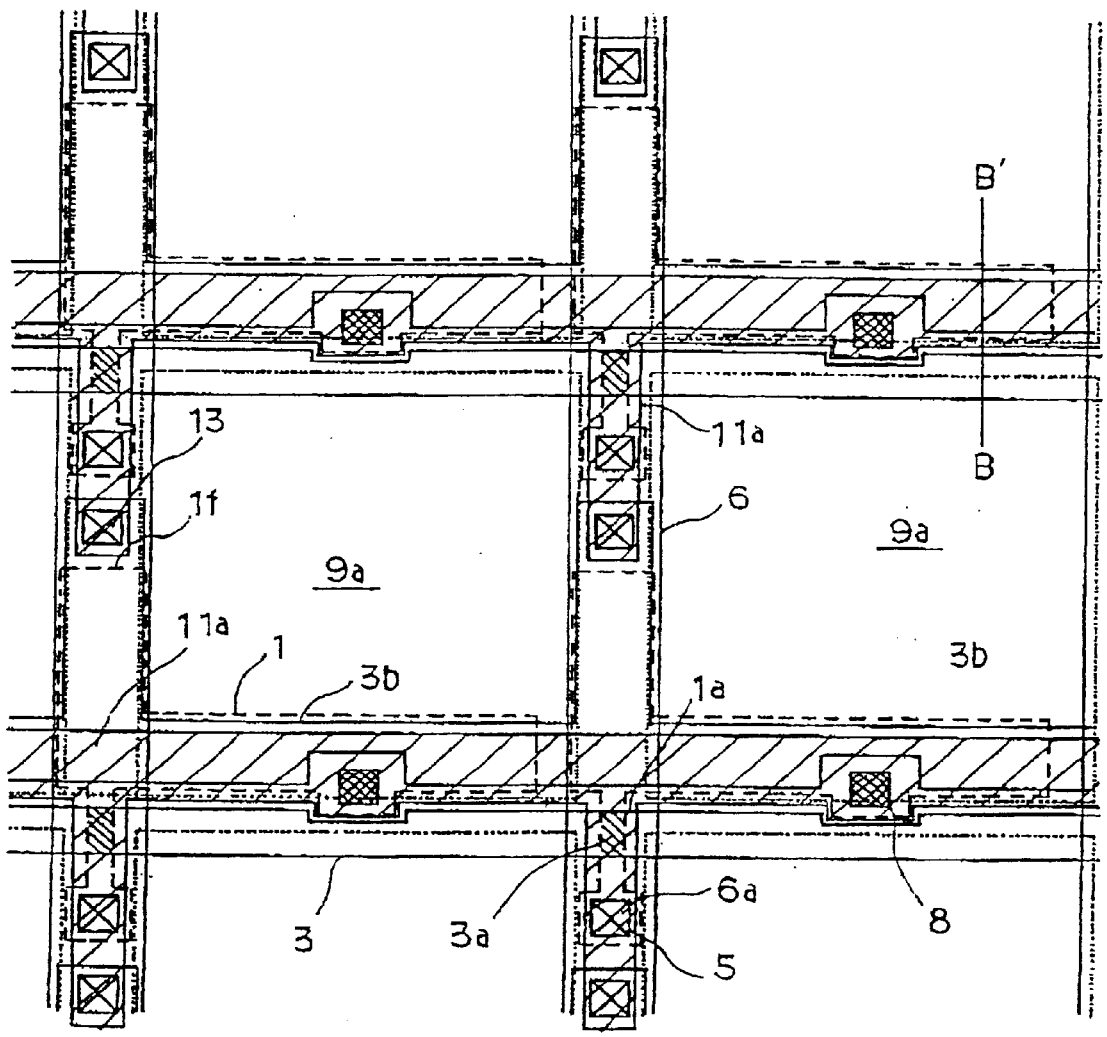

[FIG. 11]
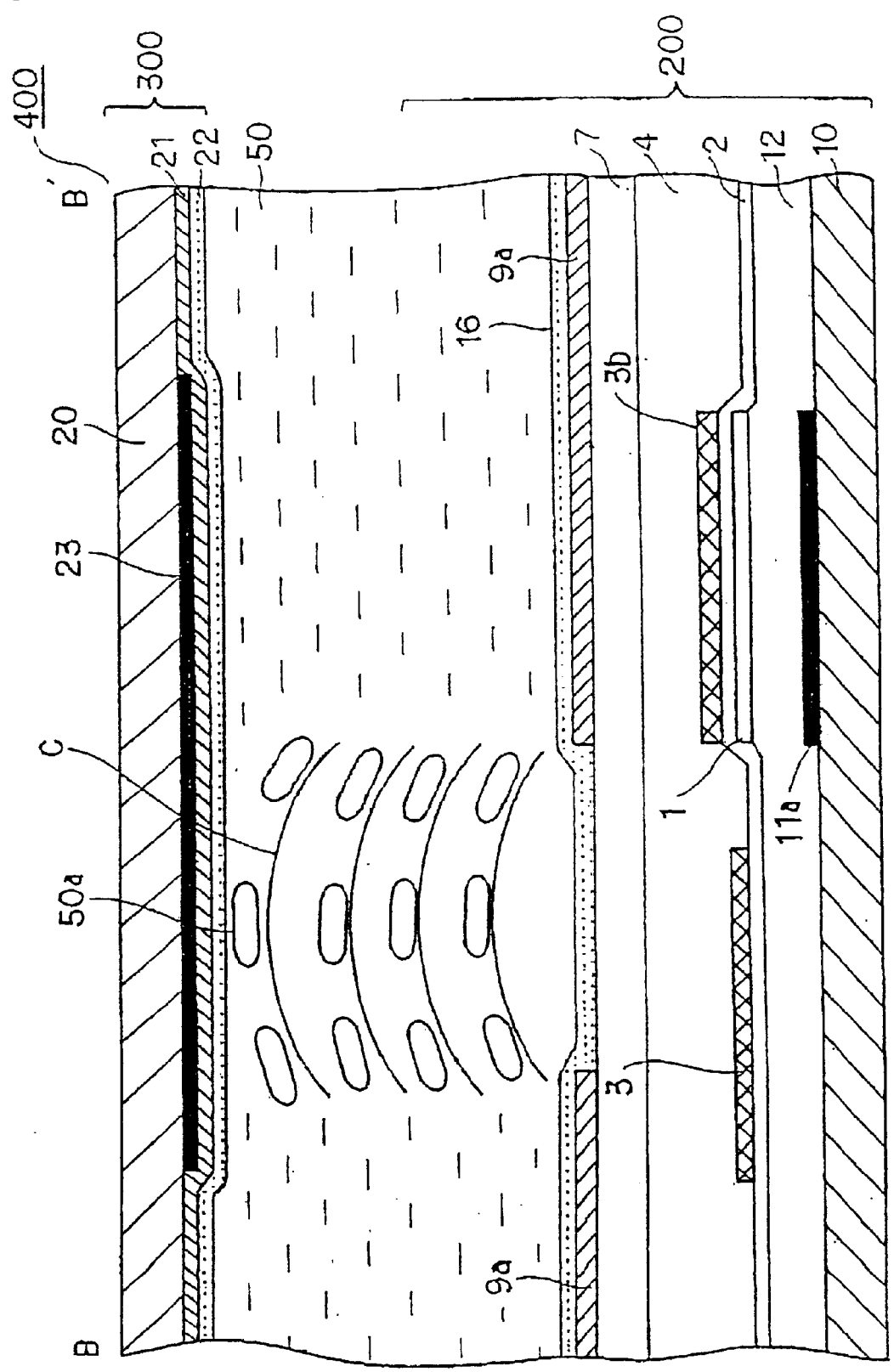

[FIG. 12]
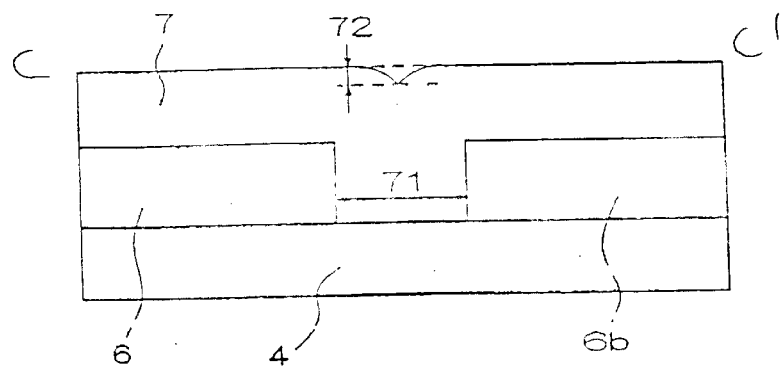
[FIG. 13]
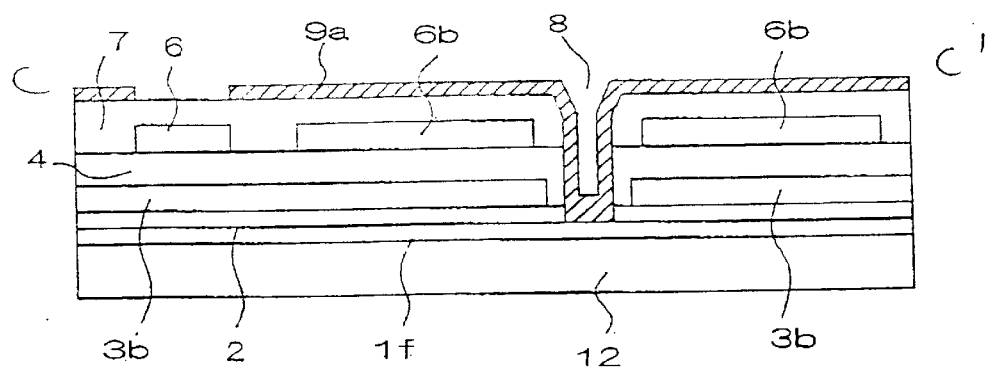

[FIG. 14]
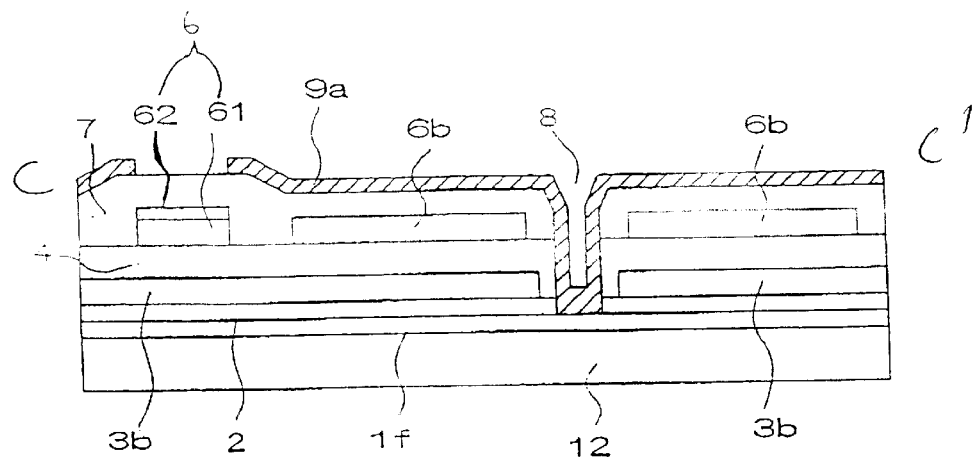
[FIG. 15]
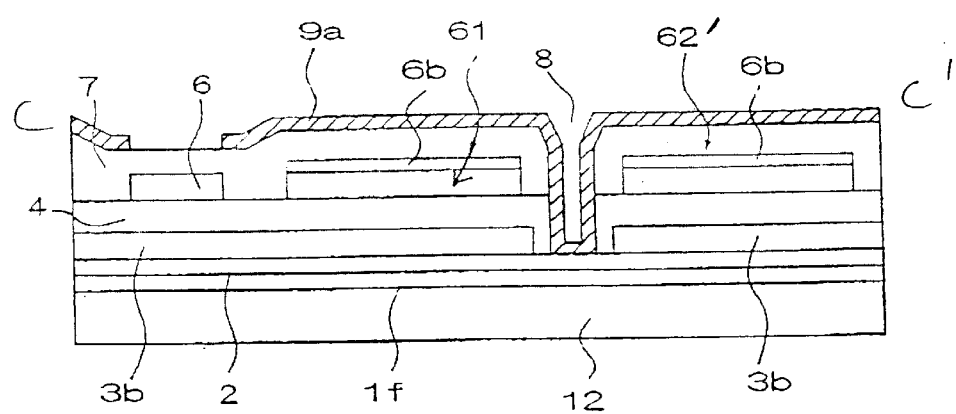

[FIG. 16]
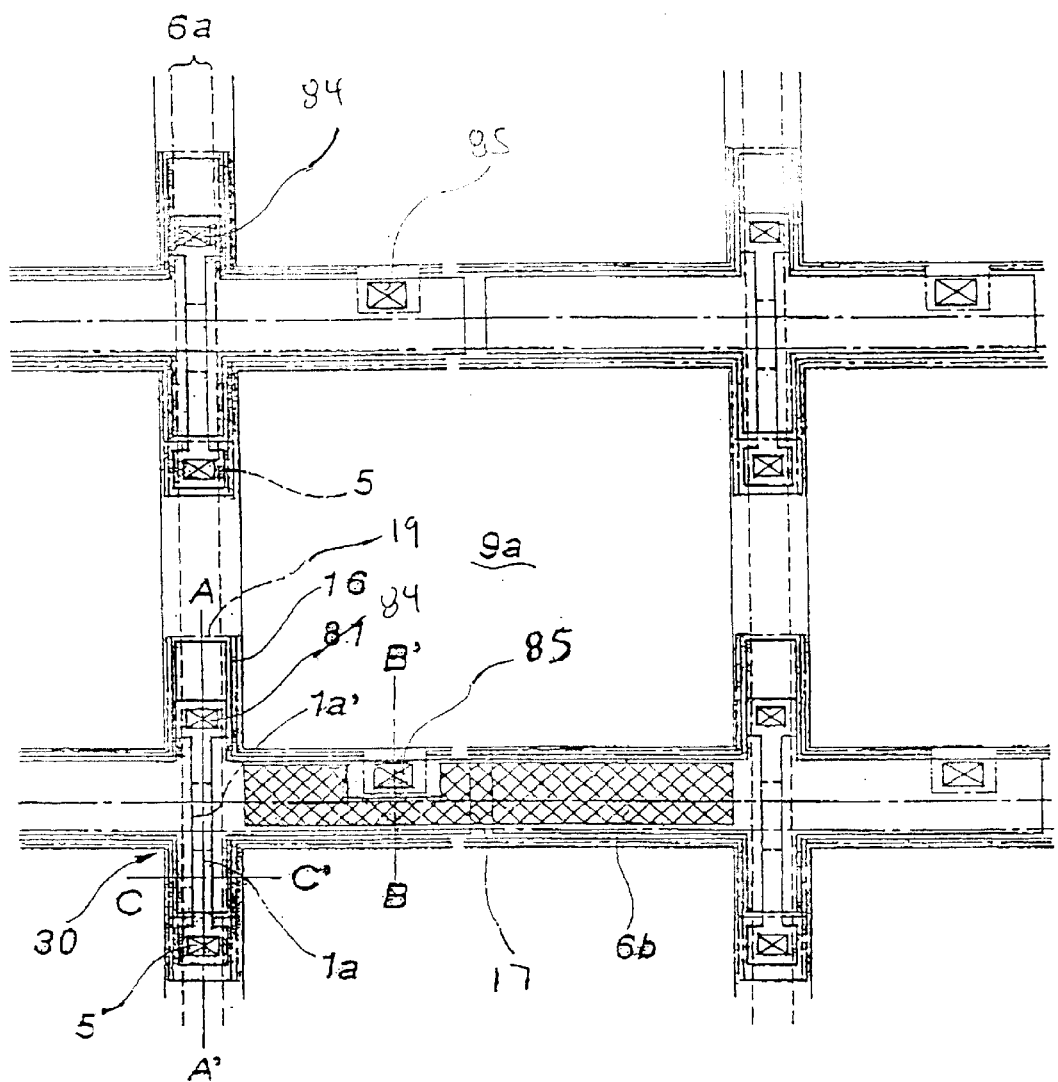

[FIG. 17]
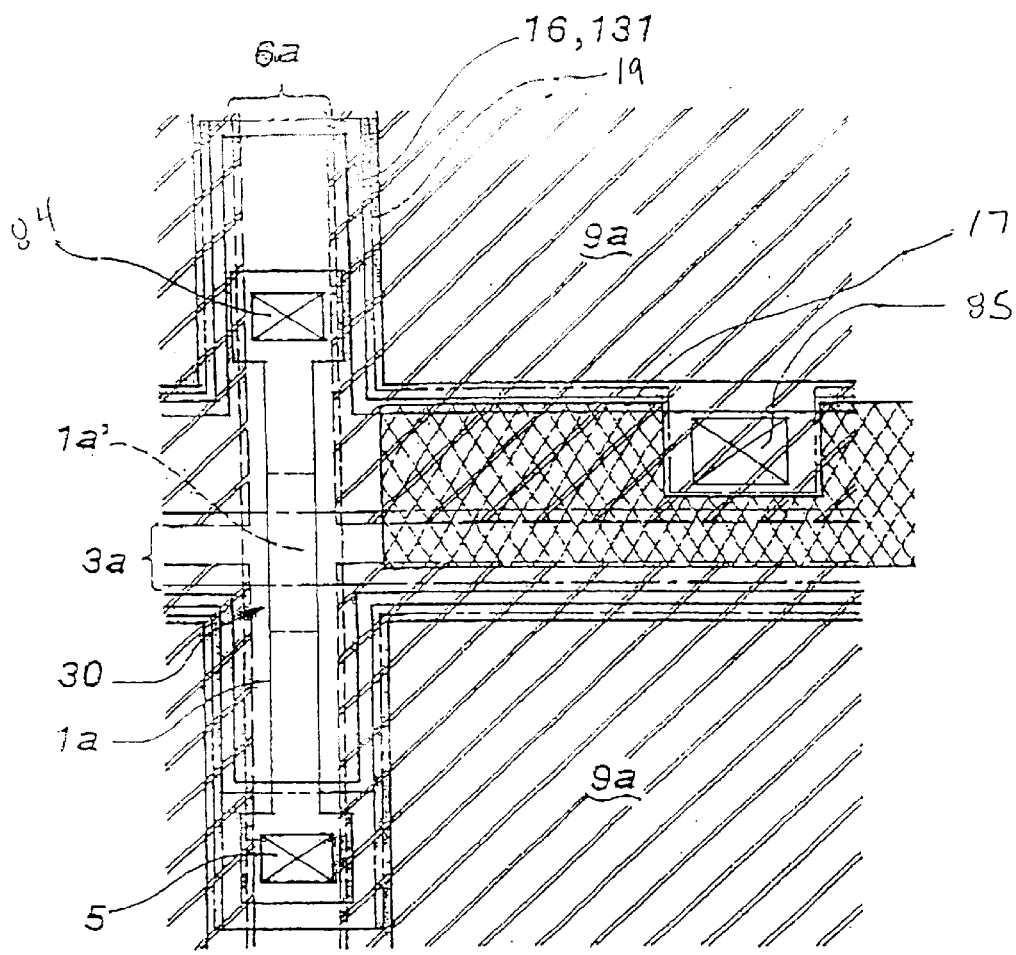

[FIG. 18]
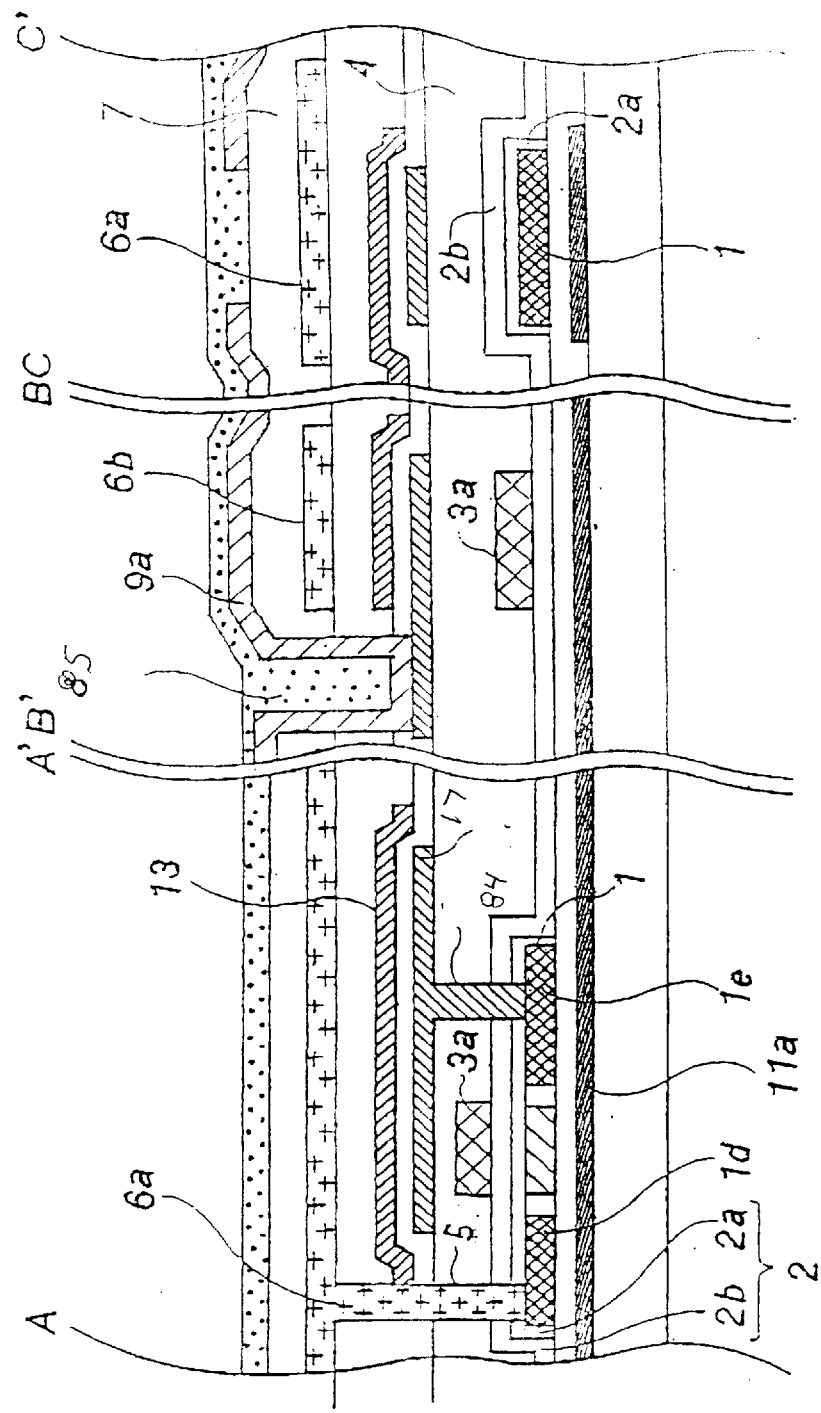

LIQUID CRYSTAL DEVICE, PROJECTOR, AND METHOD OF MANUFACTURING THE LIQUID CRYSTAL DEVICE

BACKGROUND OF THE INVENTION

1. Field of Invention

The invention relates to the technical field of a liquid crystal device having a structure comprising pixel electrodes arranged in a matrix, and particularly to the technical field of a liquid crystal device having a structure comprising a planarized interlayer insulating film provided below pixel electrodes.

2. Description of Related Art

As shown in FIG. 11, a conventional liquid crystal device 400 comprises a liquid crystal layer 50 held between a counter substrate 300 and a TFT array substrate 200. FIG. 10 is a plan view showing a TFT array substrate of a liquid crystal device, and FIG. 11 is a longitudinal sectional view of the liquid crystal device taken along line B–B' in FIG. 10, showing the vicinity of the region between adjacent pixel electrodes arranged along the data line direction.

As shown in FIGS. 10 and 11, the TFT array substrate 200 comprises a plurality of scanning lines 3 and a plurality of data lines 6, which are arranged to cross each other on a substrate 10 made of quartz, glass, or the like, a thin film transistor and a pixel electrode 9a electrically connected thereto at each of the intersections of the scanning lines 3 and the data lines 6, and capacitance lines 3b arranged in parallel with the scanning lines. Each of the thin film transistors comprises a semiconductor layer 1 shown by a dotted line, a gate insulating film 2, and a gate electrode 3a which comprises a portion of the scanning lines 3. Each of the pixel electrodes 9a is electrically connected to the semiconductor layer 1 through a contact hole 8, and a part of each of the data lines 6 functions as a source electrode 6a, and is electrically connected to the semiconductor layer 1 through a contact hole 5.

As shown in FIG. 11, in the TFT array substrate 200, a light shielding film 11a patterned in a predetermined shape, a base insulating film 12, the semiconductor film 1 formed in a predetermined shape, the gate insulating film 2, the scanning lines 3 and capacitance lines 3b, and an interlayer insulating film 4 are successively laminated on the substrate 10. Furthermore, the data lines 6 (not shown in FIG. 11), an interlayer insulating film 7 arranged to cover the data lines 6, and the pixel electrodes 9a are successively laminated on the interlayer insulating film 4.

On the other hand, the counter substrate 300 comprises a counter electrode 21 formed over the entire surface of the lower side.

In the liquid crystal device, the optical properties of liquid crystal molecules of the liquid crystal layer 50 located between the counter electrode 21 and the pixel electrodes 9a are changed by a potential difference between the voltage applied to the counter electrode 21 and the voltage applied to each of the pixel electrodes 9a.

In the conventional liquid crystal device, in order to improve the display properties, the interlayer insulating film 7 provided below the pixel electrodes 9a is planarized to planarize the surface of the liquid crystal layer side of the TFT array substrate, preventing orientation defects from occurring in the liquid crystal molecules due to surface steps.

As shown in FIG. 11, for example, when voltages of different magnitudes are applied to the adjacent pixel electrodes 9a, transverse electric field C occurs in the vicinities of the regions between the adjacent pixel electrodes 9a. As a result, in the vicinities of the regions between the adjacent pixel electrode 9a, the direction of the liquid crystal molecules 50a are affected by the direction of the transverse electric field C. Therefore, the liquid crystal molecules in the vicinities of the regions between the adjacent pixel electrodes are not oriented in the desired direction, thereby causing orientation defects. In the defective liquid crystal orientation regions, the orientation direction of the liquid crystal molecules differs from that of regions where the liquid crystal molecules are normally oriented without being affected by the transverse electric field. As a result, bright lines referred to as "disclination lines" occur, causing the problem of deteriorated display quality of the liquid crystal device. In addition, the pitch of the pixel electrodes has been recently decreased to increase the definition of the liquid crystal device, making the problem more serious.

Furthermore, a light shielding film 23 formed on the counter substrate side in order to conceal such display defects has the problem of significantly decreasing the aperture ratio of the pixel region.

The invention has been designed in consideration of the above-described problems, and one object of the invention is to provide a liquid crystal device causing no display defect and having a high aperture ratio.

SUMMARY OF THE INVENTION

One aspect of the invention relates to a liquid crystal device having a liquid crystal layer held between first and second substrates. A counter electrode is provided on the first substrate. Provided on the second substrate are pixel electrodes arranged in a matrix, switching elements respectively connected to the pixel electrodes, a lower interlayer insulating film having a planarized film and arranged on the switching elements, data lines provided on the lower interlayer insulating film, and a second interlayer insulating film arranged on the data lines below the pixel electrodes. A pattern film is arranged on the lower interlayer insulating film below the pixel electrodes so that the pattern film is located in the regions between the adjacent pixel electrodes arranged along the data lines or scanning lines.

In the above aspect of the invention, the pattern film is provided on the planarized surface of the substrate so that in the vicinities of the regions between adjacent pixel electrodes arranged along the scanning lines or the data lines, the magnitude of a longitudinal electric field produced between the end of each of the pixel electrodes and the counter electrode in the thickness direction of the liquid crystal layer is higher than that of an electric field (referred to as a "transverse electric field" hereinafter) produced between the adjacent pixel electrodes in the transverse direction. Namely, by arranging the pattern film on the planarized substrate surface in the vicinities of the regions between the respective pixel electrodes, the distance between the pixel electrodes and the counter electrode in the vicinities of the regions between the respective pixel electrodes can be controlled easily. In addition, the thickness of the pattern film can be set to any desired value so that the distance between the pixel electrodes and the counter electrode can be set to a desired value to control the magnitude of the longitudinal electric field. This aspect of the invention has the effect of preventing orientation defects from occurring, due to the transverse electric field, and obtains a liquid crystal device having high display quality.

This aspect of the invention is particularly effective for a liquid crystal display which has significant display defects due to the transverse electric field, and which include a planarized second substrate. The pattern film having any desired thickness is arranged at a specified position of the second substrate having the planarized surface, to positively provide steps in the surface and prevent the occurrence of the transverse electric field between the pixel electrodes, thereby obtaining a liquid crystal device causing no display defect due to the transverse electric field.

The pattern film preferably is part of the same film that forms the data lines. This construction permits the simultaneous formation of the data lines and the pattern film, and thus the pattern film can be formed only by changing a pattern mask without increasing the number of the manufacturing steps.

A liquid crystal device according to this aspect of the invention includes a liquid crystal layer held between first and second substrates, a counter electrode provided on the first substrate, a plurality of scanning lines and a plurality of data lines arranged to cross each other, an upper interlayer insulating film arranged to cover the scanning lines and the data lines, a plurality of pixel electrodes respectively arranged at the intersections of the scanning lines and the data lines in a matrix on the upper interlayer insulating film, and a pattern film arranged on a planarized surface and below the upper interlayer insulating film so as to be located in the regions between the adjacent pixel electrodes arranged along the data lines or scanning lines, all of which are provided on the second substrate.

Preferably, the pattern film is provided on the planarized surface of the substrate so that in the vicinities of the regions between adjacent pixel electrodes arranged along the scanning lines or the data lines, the magnitude of a longitudinal electric field produced between the end of each of the pixel electrodes and the counter electrode in the thickness direction of the liquid crystal layer is higher than that of a transverse electric field produced between the adjacent pixel electrodes in the transverse direction. Namely, by arranging the pattern film on the planarized substrate surface in the vicinities of the regions between the respective pixel electrodes, the distance between the pixel electrodes and the counter electrode in the vicinities of the regions between the respective pixel electrodes can be controlled easily. In addition, the thickness of the pattern film can be set to any desired value so that the distance between the pixel electrodes and the counter electrode can be set to a desired value to control the magnitude of the longitudinal electric field. This aspect of the invention thus has the effect of preventing orientation defects from occurring due to the transverse electric field, to obtain a liquid crystal device having high display quality.

The invention is particularly effective for a liquid crystal display which has significant display defects due to the transverse electric field, and which includes a planarized second substrate. The pattern film having any desired thickness is arranged at a specified position of the second substrate having the planarized surface to positively provide steps in the surface and prevent the occurrence of the transverse electric field between the pixel electrodes, thereby obtaining a liquid crystal device causing no display defect due to the transverse electric field.

In addition, a light shielding film need not be provided on the first substrate side in order to conceal the defective display region caused by the transverse electric field, and thus the line width of a light shielding film on the counter substrate side can be narrowed, improving the aperture ratio of the pixel region.

Furthermore, the width of the regions between the adjacent pixel electrodes preferably is longer than the distance between the edges of the pixel electrodes and the counter electrode in the vicinities of the regions between the pixel electrodes. In this construction, in the regions between the adjacent pixel electrodes arranged along the scanning lines or data lines, the magnitude of an electric field produced between the edges of the pixel electrodes and the counter electrode can be increased securely, as compared with the magnitude of an electric field produced between the adjacent pixel electrodes, thereby causing the effect of preventing the occurrence of orientation defects due to the transverse electric field, and obtaining a liquid crystal device having high display quality.

Furthermore, preferably the edges of the pixel electrodes are overlapped with the pattern film. This construction has the effect of improving the aperture ratio of the display region.

Furthermore, the pattern film may be formed in the same layer as the data lines. This construction permits the formation of the pattern film at the same time as the data lines, and thus the pattern film can be formed only by changing a pattern mask without the need to increase the number of manufacturing steps. The pattern film may be formed in any pattern shape as long as the adjacent data lines are not electrically connected to each other. For example, the pattern film may be connected to the data lines.

Furthermore, the distance between the pattern film and each of the data lines may be not more than twice as long as the thickness of the upper interlayer insulating film. In this construction, when the pattern film is arranged between the data lines, there are spaces between the pattern film and the data lines to decrease steps in the spaces, thereby causing the effect of preventing the occurrence of orientation defects due to the transverse electric field between the data lines and the pattern film. Thus, there is the effect of improving the aperture ratio of the display region, and improving display quality.

The planarized lower interlayer insulating film is provided to cover the scanning lines. The data lines and the pattern film are provided on the lower interlayer insulating film so that the pattern film covers at least portions of the scanning lines. The upper interlayer insulating film is provided to cover the data lines and the pattern film.

In this construction, the lower interlayer insulating film is planarized to planarize the region of the surface of the second substrate which contacts the liquid crystal layer, and which contributes to display quality when the liquid crystal device is assembled. Therefore, the orientation defects due to surface steps of the second substrate are prevented from occurring in the display region, thereby exhibiting the effect of obtaining a liquid crystal device having high display quality. The pattern film is arranged at a specified position of the second substrate having the planarized surface to positively provide surface steps, preventing the occurrence of the transverse electric field between the pixel electrodes, and obtaining a liquid crystal device having no display defect due to a transverse electric field.

In this construction, even when the pattern film is partly formed on the scanning lines, the lower interlayer insulating film is formed between the scanning lines and the pattern film to prevent the occurrence of a short circuit. At the same time, the lower interlayer insulating film is partly formed between the pattern film and the data lines, thereby obtaining a liquid crystal device causing no short circuit between the data lines that are not electrically connected to the pattern film.

Furthermore, the lower interlayer insulating film preferably is an inorganic film. When the liquid crystal device having this construction is used as a light valve of a projector, for example, the lower interlayer insulating film is prevented from deteriorating due to light from a light source, thereby obtaining a high-quality projector.

In the liquid crystal device, generally, the liquid crystal layer side surface of the second substrate preferably has high flatness in order to improve display quality, and the lower interlayer insulating film with high flatness is required. As a material for obtaining such a film having high flatness, an organic film is superior to an inorganic film because the thickness can be increased easily. However, when the liquid crystal device having an organic lower interlayer insulating film is used as a light valve of a projector, particularly when used as a blue light valve, there is the problem of the organic film deteriorating due to blue light emitted from a light source. In order to avoid this problem, an inorganic film is used as the material for the lower interlayer insulating film. When using the inorganic film, for example, the surface of the inorganic film must be planarized by CMP treatment (mechanical polishing) in order to improve the flatness of the film. In the liquid crystal device using the planarized film as the lower interlayer insulating film, the pixel electrodes are arranged on the upper interlayer insulating film having high flatness, and thus the problem of display defects due to the transverse electric field produced between the adjacent pixel electrodes is significant. In order to prevent the occurrence of the display defects due to the transverse electric field, according to one aspect of the invention, the pattern film is provided to positively provide surface steps, controlling the distance between the pixel electrodes and the counter electrode, and preventing the occurrence of the transverse electric field.

Therefore, the invention can be applied to a liquid crystal device that uses a planarized inorganic insulating film like the liquid crystal device used as a blue light valve of a projector, to obtain a liquid crystal device having no display defect due to the transverse electric field.

A projector of the present invention includes a light source, a liquid crystal light valve for modulating incident light emitted from the light source according to image information, and a projection lens that projects the light modulated by the liquid crystal light valve. The liquid crystal light valve is the above-described liquid crystal device.

The projector having this construction has high quality. Particularly, by using an inorganic film as the lower interlayer insulating film in a blue light valve, the deterioration in the lower interlayer insulating film due to the light emitted from the light source can be prevented, obtaining a high-quality projector.

A method of manufacturing a liquid crystal device of the invention includes the steps of: (1) forming a counter electrode on a first substrate to form a counter substrate; (2) forming a plurality of scanning lines and a plurality of data lines on a second substrate so that the scanning lines and the data lines cross each other; (3) forming an upper interlayer insulating film to cover the plurality of scanning lines and data lines; (4) forming a plurality of pixel electrodes on the upper interlayer insulating film at the intersections of the scanning lines and the data lines; (5) forming a pattern film on a planarized surface below the upper interlayer insulating film so that the pattern film is located in the regions between the adjacent pixel electrodes arranged along the data lines or the scanning lines to form an array substrate; (6) arranging the counter substrate and the array substrate with a gap therebetween so that the counter electrode is opposed to the pixel electrodes; and (7) injecting a liquid crystal into the gap.

In the liquid crystal device manufactured by the above manufacturing method the pattern film is arranged on the planarized surface of a substrate so that in the vicinities of the regions between the adjacent pixel electrodes arranged along the scanning lines or the data lines, the magnitude of a longitudinal electric field produced between the edges of the pixel electrodes and the counter electrode in the thickness direction of the liquid crystal layer is higher than that of a transverse electric field produced between the adjacent pixel electrodes in the transverse direction. Namely, by arranging the desired pattern film on the planarized surface of the substrate in the vicinities of the regions between the pixel electrodes, the distance between the pixel electrodes and the counter electrode in the vicinities of the regions between the pixel electrodes can be controlled easily. Therefore, the thickness of the pattern film can be set to any desired value to set the distance between the pixel electrodes and the counter electrode to a desired value so that the magnitude of the longitudinal electric field can be controlled. As a result, the occurrence of orientation defects due to the transverse electric field can be prevented to cause the effect of obtaining a liquid crystal device having high display quality.

Particularly, the invention is effective for a liquid crystal device which uses the array substrate having a planarized surface, and which easily causes display defects due to the transverse electric field. The pattern film having a desired thickness is provided at a specified position of the second substrate having the planarized surface to positively provide steps in the surface, thereby preventing the occurrence of the transverse electric field between the pixel electrodes, and obtaining a liquid crystal device having no display defect due to the transverse electric field.

A method according to one aspect of the invention includes the steps of: (1) forming a lower interlayer insulating film having the planarized surface to cover the scanning lines; (2) simultaneously forming the data lines and the pattern film on the lower interlayer insulating film; and (3) forming the upper interlayer insulating film to cover the data lines and the pattern film. This construction permits the simultaneous formation of the data lines and the pattern film, and thus the pattern film can be formed only by changing a pattern mask without the need to increase the number of manufacturing steps. The pattern film may be formed in any shape as long as the adjacent data lines are not electrically connected to each other. For example, the pattern film may be connected to the data lines.

A liquid crystal device according to one aspect of the invention includes a liquid crystal layer held between first and second substrates. A counter electrode is provided on the first substrate. Pixel electrodes are arranged in a matrix, and switching elements are respectively connected to the pixel electrodes. A lower interlayer insulating film is arranged on the switching elements, data lines are provided on the lower interlayer insulating film, and an upper interlayer insulating film is provided on the data lines below the pixel electrodes. A pattern film is arranged between the lower and upper interlayer insulating films below the pixel electrodes to be located in the regions between the adjacent pixel electrodes arranged along the scanning lines. Drain electrodes are connected to the switching elements with a dielectric film provided therebetween, and a light shielding film, both of which are provided between the data lines and the scanning lines. The pattern film is arranged to overlap the scanning lines and the light shielding film.

In this construction, the pattern film is provided so that in the vicinities of the regions between the adjacent pixel electrodes arranged along the scanning lines, the magnitude of a longitudinal electric field produced between the edges of the pixel electrodes and the counter electrode in the thickness direction of the liquid crystal layer is higher than that of a transverse electric field produced between the adjacent pixel electrodes. This can prevent the occurrence of orientation defects due to the transverse electric field to obtain a liquid crystal device having high display quality. In addition, the pattern film is provided to overlap the light shielding film and the scanning lines, thereby securely shielding the vicinities of the scanning lines against light.

Preferably, the pattern film is formed in the same film as the data lines. Therefore, the pattern film can be formed at the same time as the data lines, and thus the pattern film can be formed only by changing the pattern mask without increasing the number of manufacturing steps.

BRIEF DESCRIPTION OF THE DRAWINGS

FIG. 1 is a plan view of a plurality of adjacent pixel groups on a TFT array substrate on which data lines, scanning lines, pixel electrodes, light shielding film, etc. are formed in accordance with a first embodiment of the invention.

FIG. 2 is a sectional view taken along line B–B' in FIG. 1.

FIG. 3 is a sectional view taken along line A–A' in FIG. 1.

FIGS. 4(a)–4(h) are drawings showing in order, the steps of the process for manufacturing a TFT array substrate of a liquid crystal device in accordance with an embodiment of the invention.

FIGS. 5(a)–5(f) are drawings showing in order, the steps of the process for manufacturing a TFT array substrate of a liquid crystal device in accordance with an embodiment of the invention.

FIGS. 6(a)–6(f) are drawings showing in order, the steps of the process for manufacturing a TFT array substrate of a liquid crystal device in accordance with an embodiment of the invention.

FIG. 7 is a plan view showing a TFT array substrate together with components formed thereon in accordance with an embodiment of the invention, as viewed from the counter substrate side.

FIG. 8 is a sectional view taken along line H–H' in FIG. 7.

FIG. 9 is a drawing of the construction of a projector using a liquid crystal device.

FIG. 10 is a plan view of a plurality of adjacent pixel groups on a TFT array substrate on which data lines, scanning lines, pixel electrodes, a light shielding film, etc. are formed in a conventional liquid crystal device.

FIG. 11 is a sectional view taken along line B–B' in FIG. 10.

FIG. 12 is an enlarged sectional view of the vicinity of a data line, taken along line C–C' in FIG. 1.

FIG. 13 is a sectional view of a case in which the same electric field is applied to the data line side and the scanning line side, taken along line C–C' in FIG. 1.

FIG. 14 is a sectional view of a case in which a higher electric field is applied to the data line side than to the scanning line side, taken along line C–C' in FIG. 1.

FIG. 15 is a sectional view of a case in which a higher electric field is applied to the scanning line side than to the data line side, taken along line C–C' in FIG. 1.

FIG. 16 is a plan view of a plurality of adjacent pixel groups on a TFT array substrate on which data lines, scanning lines, pixel electrodes, a light shielding film, etc. are formed in accordance with a second embodiment of the invention.

FIG. 17 is an enlarged view of a portion of FIG. 16.

FIG. 18 is a sectional view taken along lines A–A', B–B' and C–C' in FIG. 16.

DETAILED DESCRIPTION OF PREFERRED EMBODIMENTS

Embodiments of the invention will described below with reference to the drawings.

A. First Embodiment

The construction of a liquid crystal device and a method of manufacturing the same in accordance with the first embodiment of the invention are described with reference to FIGS. 1 to 6. FIG. 1 is a plan view showing a plurality of adjacent pixel groups of a TFT array substrate on which data lines, scanning lines, pixel electrodes, a light shielding film, etc. are formed. FIG. 2 is a longitudinal sectional view of the liquid crystal device taken along line B–B' in FIG. 1, FIG. 3 is a longitudinal sectional view of the liquid crystal device taken along line A–A' in FIG. 1. FIGS. 4(a) to 6(f) are drawings illustrating the steps of manufacturing the TFT array substrate based on the A–A' sectional view and the B–B' sectional view. In each of the drawings, layers and members are shown on different reduced scales in order to make the layers and members more recognizable.

As shown in FIGS. 2 and 3, a liquid crystal device 400 includes a liquid crystal layer 50 having a liquid crystal sealed in the space between a counter substrate 300 and a TFT array substrate 200, which space is surrounded by a sealant (refer to FIGS. 7 and 8), which will be described below. The liquid crystal layer 50 can be, for example, a nematic liquid crystal material or a mixture of a plurality of nematic liquid crystal material. The sealant can be an adhesive composed of, for example, a photo-curing resin or heat curing resin for bonding the peripheries of the counter substrate 300 and the TFT array substrate 200. In order to set the distance between both substrates to a predetermined value, glass fibers, glass beads, or the like are mixed with the sealant. The structure of the TFT array substrate 200 is described below.

As shown in FIG. 1, the TFT array substrate 200 includes a plurality of scanning lines 3 and a plurality of data lines 6, which are arranged on a quartz substrate 10 to cross each other. Thin film transistors respectively are provided at the intersections of the scanning lines 3 and the data lines 6. Pixel electrodes 9a respectively are electrically connected to the thin film transistors. Capacitance lines 3b are arranged in parallel with the scanning lines.

As shown in FIGS. 1 and 3, each of the thin film transistors (referred to as "TFTs" hereinafter) 30 serves as a switching element for respectively controlling switching of the pixel electrodes 9a, and includes a semiconductor layer 1 shown by dotted lines, a gate insulating film 2, and a gate electrode 3a which constitutes a portion of the scanning lines 3. Each of the pixel electrodes 9a is electrically connected to the semiconductor layer 1 through a contact hole 8. A source electrode 6a, which constitutes a portion of the data lines 6, is electrically connected to the semiconductor layer 1 through a contact hole 5. A first light shielding film 11a (shown by oblique lines in FIG. 1) is electrically connected to the capacitance lines 3b through contact holes 13. Each of the thin film transistors 30 has LDD (Lightly Doped Drain) structure, and will be described in detail later with respect to the manufacturing method therefor.

As shown in FIGS. 1 to 3, in the TFT array substrate 200, the first light shielding film 11a (shown by oblique lines in FIG. 1) patterned in a predetermined shape is provided on the quartz substrate 10. The first light shielding film 11a can be a single metal, an alloy, a metal silicide, or the like preferably containing at least one of opaque high-melting-point metals such as Ti, Cr, W, Ta, Mo, and Pb. By using such a material, the first light shielding film 11a can be prevented from being broken or melted by high-temperature processing in the step of forming the pixel switching TFTs 30 after the step of forming the first light shielding film 11a of the TFT array substrate 200. The first light shielding film 11a can prevent the incidence of light returned from the substrate 10 side on the channel region 1a and LDD region of each of the pixel switching TFTs 30, thereby preventing the properties of the pixel switching TFTs 30 from deteriorating due to the occurrence of a photocurrent.

A base insulating film 12 is arranged on the first light shielding film 11a to cover it. The base insulating film 12 is provided for electrically insulating the semiconductor film 1, which constitutes the pixel switching TFTs 30, from the first light shielding film 11a. The base insulating film 12 is formed over the entire surface of the quartz substrate 10, and thus functions as a base film for the TFTs 30. Namely, the base insulating film 12 functions to prevent the properties of the pixel switching TFTs 30 from deteriorating due to the surface roughness of the quartz substrate 10 caused by polishing, stains remaining after cleaning, or the like. The base insulating film 12 can be, for example, highly insulating glass such as NSG (non-doped silicate glass), PSG (phosphosilicate glass), BSG (borosilicate glass), BPSG (borophosphosilicate glass), or the like, a silicon oxide film, a silicon nitride film, or the like. The base insulating film 12 can also prevent the first light shielding film 11a from contaminating the pixel switching TFTs 30.

The semiconductor film 1 (surrounded by the dotted line in FIG. 1), formed along the data lines 6 and the scanning lines 3, is arranged on the base insulating film 12, and the gate insulating film 2 is arranged to cover the semiconductor film 1. The semiconductor film 1 can be, for example, a silicon single crystal film, a non-single crystal film, or the like.

A plurality of the scanning lines 3, formed from a polysilicon film, are arranged on the gate insulating film 2 to partially overlap the semiconductor layer 1, so that the overlap regions of the semiconductor layer 1 function as the channel regions 1a, and the overlap regions of the scanning lines 3 function as the gate electrodes 3a.

Furthermore, the capacitance lines 3b, formed in the same layer as the scanning lines 3, are arranged on the gate insulating film 2. The capacitance lines 3b have linear main portions substantially parallel to the scanning lines 3, and projections formed along the data lines 6. In this embodiment, the gate insulating film 2 is extended from positions opposite to the scanning lines 3 to be used as a dielectric film, portions of the semiconductor film 1 are used as first storage capacitance electrodes 1f, and portions of the capacitance lines 3b opposite thereto are used as second storage capacitance electrodes to form storage capacitors 70.

In this embodiment, particularly, the capacitance lines 3b are electrically connected to the first light shielding film 11a through the contact holes 13. Therefore, the resistance of the capacitance lines 3b is significantly decreased by the resistance of the first light shielding film 11a. In this embodiment, each of the capacitance lines 3b is a high-resistance polysilicon film, and thus has a resistance of about several hundreds KΩ even in a small liquid crystal device having a diagonal of about 1.3 or 0.9 inch. However, the first light shielding film 11a is a conductive high-melting-point metal film, thereby significantly decreasing the resistance of the capacitance lines 3b in the direction along the scanning lines 3.

A planarized interlayer insulating film (lower interlayer insulating film) 4 is arranged to cover the scanning lines 3 and the capacitance lines 3b. Furthermore, a plurality of the data lines 6 formed to cross the scanning lines 3, and an island-like pattern film 6b formed in the same layer as the data lines 6 are formed on the interlayer insulating film 4. The pattern film 6b is arranged in the regions between the adjacent pixel electrodes 9a, for example, along the data lines 6, so that the ends of the pattern film overlap the ends of the pixel electrodes 9a. Also, the pattern film 6b is formed to partially overlap the scanning lines 3 and the capacitance lines 3b in a planar manner. The pattern film 6b has a structure in which the pattern film is arranged away from the contact holes 8 so as not to be electrically connected to the contact holes 8.

An interlayer insulating film (upper interlayer insulating film) 7 is arranged to cover the data lines 6, and a plurality of the matrix-formed pixel electrodes 9a formed of an ITO film are provided on the interlayer insulating film 7 so as to be located at the intersections of the scanning lines 3 and the data lines 6. Furthermore, a polyimide alignment film 16 is arranged over the entire surface of the substrate.

Next, the structure of the counter substrate is described.

The counter substrate 300 includes a second light shielding film 23 formed in a matrix on a glass substrate 20, and a counter electrode 21, and an alignment film 22 formed over the entire surface of the substrate. The counter electrode 21 is a transparent conductive film, for example, an ITO (indium titanium oxide) film. The alignment film 22 is an organic film such as a polyimide film. The second light shielding film 23 is provided in regions of the pixels other than the aperture regions, for preventing incident light from the counter substrate 300 side from entering the channel regions 1a and the LDD (Lightly Doped Drain) regions of the semiconductor layer 1 in the pixel switching TFTs 30. Furthermore, the second light shielding film 23 functions to improve contrast and prevent color mixing of colorants.

In this embodiment, as shown in FIG. 2, the pattern film 6b is arranged so that the distance d1 between the adjacent pixel electrodes 9a arranged along the data line direction is longer than the distance d2 between the counter electrode 21 and the ends of the pixel electrodes 9a near the regions between the adjacent pixel electrodes. In this embodiment, d1 is 1.5 to 3.5 μm, preferably 2.0 to 3.0 μm, d2 is 1.0 to 3.0 μm, preferably 1.5 to 2.5 μm, and the line width d3 of the pattern film 6b is 5 μm. These distances are not limited to these values as long as the distance d1 is longer than the distance d2. In a liquid crystal device having this construction, the magnitude of an electric field produced between the pixel electrodes 9a and the counter electrode 21 in the thickness direction of the liquid crystal layer 50 near the regions between the adjacent pixel electrodes is higher than that of an electric field (transverse electric field) produced between the pixel electrodes 9a in the direction perpendicular to the thickness direction of the liquid crystal layer 50. Therefore, the liquid crystal molecules in the regions between the adjacent pixel electrodes 9a are influenced by the electric field in the thickness direction of the liquid crystal layer 50, thereby preventing the occurrence of orientation defects of the liquid crystal molecules due to the transverse electric field. As shown in FIG. 2, the pattern film 6b is arranged to overlap the ends of the pixel electrodes 9a to improve the aperture ratio of the pixel region.

The process for manufacturing the TFT array substrate 200 of the liquid crystal device is next described with reference to FIGS. 4(a) to 6(f). Each of these figures shows the layers of the TFT array substrate in each of the steps corresponding to the sectional views of FIGS. 2 and 3 taken along lines A–A' and B–B' of FIG. 1.

As shown in FIG. 4(a), a hard glass substrate, or the like, is prepared. In this embodiment, a quartz substrate 10 is used. The quartz substrate is preferably pre-treated by annealing at a high temperature of about 900 to 1300° C. in an inert gas atmosphere of $N_2$ (nitrogen) so that less strain occurs in the quartz substrate 10 in the subsequent high-temperature process. Namely, the quartz substrate 10 is previously heat-treated at the same temperature as, or a higher temperature than, the maximum temperature of the high-temperature treatment in the manufacturing process.

Then, a metal alloy film of a metal silicide formed of a metal such as Ti, Cr, W, Ta, Mo, Pb, is deposited over the entire surface of the treated quartz substrate 10 by sputtering, to form a light shielding film 11 having a thickness of about 100 to 500 nm, preferably about 200 nm.

Then, as shown in FIG. 4(b), a resist mask corresponding to the pattern of the first light shielding film 11a (refer to FIG. 1) is formed on the light shielding film 11 by photolithography, and the light shielding film 11 is etched through the resist mask to form the first light shielding film 11a.

Next, as shown in FIG. 4(c), the base insulating film 12 formed of a silicate glass film of NSG (non-doped silicate glass), PSG (phosphosilicate glass), BSG (borosilicate glass), BPSG (borophosphosilicate glass), or the like, a silicon nitride film, a silicon oxide film, or the like is formed, for example, by an atmospheric pressure or a low pressure CVD method using TEOS (tetraethyl orthosilicate) gas, TEB (tetraethyl borate) gas, TMOP (tetramethyloxy phosphate) gas, or the like. The base insulating film 12 has a thickness of, for example, about 500 to 2000 nm.

Next, as shown in FIG. 4(d), an amorphous silicon film is formed on the base insulating film 12 by low pressure CVD (for example, CVD under a pressure of about 20 to 40 Pa) using monosilane gas, disilane gas, or the like at a flow rate of about 400 to 600 cc/min in a relatively low temperature environment of about 450 to 550° C., preferably about 500° C. Then, the amorphous silicon film is annealed at about 600 to 700° C. for 1 to 10 hours, preferably 4 to 6 hours, in a nitrogen atmosphere to form a polysilicon film 80 by solid phase growth to a thickness of about 50 to 200 nm, preferably about 100 nm.

In this step, when n-channel type TFTs 30 are formed as the TFTs 30 shown in FIG. 3, the channel regions may be slightly doped with V-group element impurity ions of Sb (antimony), As (arsenic), P (phosphorus), or the like by ion implantation. When the pixel switching TFTs 30 are the p-channel type, the channel regions may be slightly doped with III-group element impurity ions of B (boron), Ga (gallium), In (indium), or the like by ion implantation or the like. The polysilicon film 80 may be formed directly by low pressure CVD or the like without passing through the amorphous silicon film. Alternatively, silicon ions may be implanted into a polysilicon film deposited by low pressure CVD or the like to form an amorphous film, followed by recrystallization by annealing to form the polysilicon film 80.

Next, as shown in FIG. 4(e), the semiconductor film 1 of polysilicon and having the predetermined pattern shown in FIG. 1 is formed by photolithography, etching, etc. The semiconductor layer 1 partially functions as first storage capacitance electrodes.

Next, as shown in FIG. 4(f), the semiconductor film 1 which constitutes the TFTs 30 is thermally oxidized at a temperature of about 900 to 1300° C., preferably about 1000° C., to form a thermal silicon oxide film having a relatively small thickness of about 30 nm. Then, a high temperature silicon oxide film (HTO film), or a silicon nitride film is deposited to a relatively small thickness of about 50 nm by low pressure CVD or the like to form the gate insulating film 2 of the TFTs 30, which has a multilayer structure. As a result, the thickness of the semiconductor layer 1 is about 30 to 150 nm, preferably about 35 to 50 nm, and the thickness of the gate insulating film 2 is about 20 to 150 nm, preferably about 30 to 100 nm. In this way, the high temperature thermal oxidation time is shortened to prevent thermal warping, particularly, in use of a large wafer of about 8 inches. However, the gate insulating film 2 having a single layer structure may be formed only by thermal oxidation of the polysilicon layer 1.

Although not limited in FIG. 4(f), the semiconductor portions serving as the first storage capacitance electrodes If may be doped with, for example, P ions in a dosage of about $3 \times 10^{12}/cm^2$ to decrease the resistance.

Next, as shown in FIG. 4(g), contact holes 13 are formed in the base insulating film 12 to reach the first light shielding film 11a by dry etching such as reactive ion etching, reactive ion beam etching, or wet etching. In forming the contact holes 13, anisotropic etching such as reactive ion etching or reactive ion beam etching has the advantage that apertures can be formed in substantially the same shape as the mask. However, the contact holes may be formed by a combination of dry etching and wet etching so that the contact holes 13 can be formed in a tapered shape, thereby causing the advantage of preventing disconnection during wiring connection.

Next, as shown in FIG. 4(h), a polysilicon film 81 is deposited by low pressure CVD, and then phosphorus (P) is thermally diffused to make the polysilicon film 81 conductive. Alternatively, P ions may be introduced at the same time as the deposition of the polysilicon film 81 to form a doped silicon film.

Next, in the step shown in FIG. 5(a), the scanning lines 3a and the capacitance lines 3b having the predetermined pattern shown in FIG. 1 are formed by photolithography, etching, etc. using a resist mask. The capacitance lines 3b and the scanning lines 3a have a thickness of about 350 nm, for example.

Next, as shown in FIG. 5(b), when the TFTs 30 shown in FIG. 3 are n-channel type TFTs having the LDD structure, the semiconductor layer 1 is doped with a low concentration (for example, P ions in a dose of 1 to $3 \times 10^{13}/cm^2$) of impurity ions 60 of a V-group element such as P, using the gate electrodes 3a partially constituting the scanning lines 3 as a diffusion mask, to form the low-concentration source regions 1b and low-concentration drain regions 1c. As a result, channel regions 1*a* are formed in the portions of the semiconductor layer 1, which are located below the gate electrodes 3*a*.

Then, as shown in FIG. 5(*c*), a resist layer 62 is formed on the gate electrodes 3*a* by using a mask wider than the gate electrodes 3*a*. Then, the semiconductor layer 1 is doped with a high concentration (for example, P ions in a dose of 1 to $3 \times 10^{15}/cm^2$) of impurity ions 61 of a V-group element such as P, to form the high-concentration source regions 1*d* and high-concentration drain regions 1*e*, obtaining the LDD structure TFTs 30. In this case, the low-concentration source regions 1*b* and low-concentration drain regions 1*c* are formed in the portions of the semiconductor layer, which are located below the resist layer 62. When the TFTs 30 are the p-channel type, the semiconductor layer 1 is doped with impurity ions of a III-group element such as B to form the low-concentration source regions 1*b*, the low-concentration drain regions 1*c*, the high-concentration source regions 1*d*, and the high-concentration drain regions 1*e*. For example, the TFTs may be offset structure TFTs formed without low-concentration doping, or self-alignment TFTs formed by ion implantation of B ions, or the like.

Impurity doping further decreases the resistances of the capacitance lines 3*b* and the scanning lines 3*a*.

Although not shown in the drawing, impurities of a III-group element such as B (boron) are then implanted to form p-channel type TFTs. This permits the formation of a driving circuit having a complementary structure including n-channel type TFTs and p-channel type TFTs in the periphery of the quartz substrate. Therefore, in this embodiment, the semiconductor layer includes polysilicon, and thus the driving circuit and the TFTs in the display region can be formed in the same step, thereby causing industrial advantages.

Next, as shown in FIG. 5(*d*), a NSG film 82 having a thickness of 1400 nm is formed to cover the scanning lines 3 and the capacitance lines 3*b* by, for example, atmospheric or low pressure CVD using TEOS gas. Besides the NSG film, silicate glass film of PSG, BSG, BPSG, or the like, a silicon nitride film, a silicon oxide film, or the like can be used.

Next, as shown in FIG. 5(*e*), the surface of the NSG film 82 is planarized by CMP treatment (mechanical polishing) to form the interlayer insulating film 4 having a thickness of 800 nm.

Next, as shown in FIG. 5(*f*), annealing is performed at about 1000° C. for 20 minutes to activate the high-concentration source regions 1*d* and the high-concentration drain regions 1*e*, and the contact holes 5 for the data lines 6 are formed by dry etching such as reactive ion etching, reaction ion beam etching, or wet etching. The contact holes for connecting the scanning lines 3 and the capacitance lines 3*b* to wiring not shown in the drawings are also formed in the interlayer insulating film 4 by the same step as the contact holes 5.

Next, as shown in FIG. 6(*a*), a metal film 83 of a metal silicide or the like of a light-shielding low-resistance metal such as Al is deposited to a thickness of about 300 nm. Furthermore, as shown in FIG. 6(*b*), the data lines 6 and the pattern film 6 are formed by photolithography, etching, etc. Since the interlayer insulating film 4 is planarized, the data lines 6 and the pattern film 6*b* are arranged on the planarized interlayer insulating film 4. The width and thickness of the pattern film 6 are set to any desired values according to the size of surface steps to be finally formed, the amount of overlap with each of the pixel electrodes formed in the later step, and the mask precision in formation of the pixel electrodes.

Next, as shown in FIG. 6(*c*), the interlayer insulating film 7 of a BPSG film having a thickness of 800 nm is formed to cover the data lines 6, for example, by atmospheric or low pressure CVD using TEOS gas or the like. Besides the BPSG film, a silicate glass film of NSG, PSG, BSG, or the like, a silicon nitride film, a silicon oxide film, or the like can be used. This forms steps in the surface of the interlayer insulating film 7 in the regions where the pattern film 6*b* is arranged. The surface steps can prevent orientation defects of the liquid crystal molecules.

Next, in the step shown in FIG. 6(*d*), the contact holes 8 for electrically connecting the pixel electrodes 9*a* and the high-concentration drain regions 1 e are formed by dry etching such as reactive ion etching, reaction ion beam etching, etc.

Next, as shown in FIG. 6(*e*), a transparent conductive film 9 comprising an ITO film is deposited to a thickness of about 50 to 200 nm on the interlayer insulating film 7 by sputtering. Furthermore, as shown in FIG. 6(*f*), the pixel electrodes 9*a* are formed by photolithography etching, etc. When the liquid crystal device is used as a reflective liquid crystal device, the pixel electrodes 9*a* may be formed by using a highreflectance opaque material such as Al .

Then, a coating solution of the polyimide alignment film is coated on the pixel electrodes 9*a*, followed by rubbing in a predetermined direction with a predetermined pre-tilt angle to form the alignment film 16 (refer to FIGS. 2 and 3).

On the other hand, for the counter substrate 300 shown in FIGS. 2 and 3, the glass substrate 20 is first prepared, and the second light shielding films 23 and 53 (refer to FIGS. 7 and 8), which will be described below, are formed by sputtering, for example, chromium metal, and then performing photolithography and etching. These second light shielding films may be formed by using a metallic material such as Cr, Ni, Al, or the like, or resin black in which carbon or Ti is dispersed in photoresist.

Then, a transparent conductive thin film of ITO or the like is deposited to a thickness of about 50 to 200 nm over the entire surface of the counter substrate 300 by sputtering or the like to form the counter electrode 21. Furthermore, a coating solution of a polyimide alignment film is coated over the entire surface of the counter electrode 21, and then rubbed in the predetermined direction with the predetermined pre-tilt angle to form the alignment film 22 (refer to FIGS. 2 and 3).

Finally, as shown in FIG. 8, the TFT array substrate 200 and the counter substrate 300 on each of which the layers are formed as described above are combined with a sealant 52 so that the alignment films 16 and 22 are opposed to each other, and a liquid crystal comprising, for example, a mixture of a plurality of nematic liquid crystals, is forced into the space between both substrates by vacuum suction to form the liquid crystal layer 50 having the predetermined thickness.

The whole construction of the liquid crystal device constructed as described above is described with reference to FIGS. 7 and 8. FIG. 7 is a plan view showing the TFT array substrate 200 together with the components formed thereon, as viewed from the counter substrate 300 side, and FIG. 8 is a sectional view taken along line H–H' of FIG. 7 including the counter substrate 300.

In FIG. 7. the sealant 52 is provided along the edge of the TFT array substrate 200, and a second light shielding film 53 comprising, for example, the same material as or a different material from the second light shielding film 23 is provided as a frame in parallel with the inside of the sealant 52. In addition, a data line driving circuit 101 and external circuit connection terminals 102 are provided outside the sealant 52 along one side of the TFT array substrate 200, and scanning line driving circuits 104 are provided along the two sides adjacent to the one side. If there is no problem of delay of a scanning signal supplied to the scanning lines 3, of course, the scanning line driving circuit 104 may be provided on one side. The data line driving circuit 101 may be provided on both sides along the sides of the image display region. For example, the data lines 6a in the odd-number lines may be supplied with image signals from the data line driving circuit provided along one side of the image display region, and the data lines 6a in the even-number lines may be supplied with image signals from the data line driving circuit provided along the other side of the image display region. In this way, the data lines 6 are driven in a comb-like manner to extend the occupied area of the data line driving circuit, thereby permitting the formation of a complicated circuit. Furthermore, a plurality of interconnections 105 are provided on the remaining side of the TFT array substrate 200, for connecting the scanning line driving circuits 104 provided on both sides of the image display region. A pre-charge circuit 201 may be further provided to be hidden below the second light shielding film 53 serving as the frame. Furthermore, a conductor 106 is provided adjacent at least one corner of the counter substrate 300, for providing electric conduction between the TFT array substrate 200 and the counter substrate 300. As shown in FIG. 7, the counter substrate 300 having substantially the same outline as the sealant 52 shown in FIG. 8, is fixed to the TFT array substrate 200 with the sealant 52.

As described above, in this embodiment, the pattern film 6b is arranged in the regions between the adjacent pixel electrodes arranged along the data lines to obtain a high-quality liquid crystal device having no defective orientation display region due to the transverse electric field produced between the adjacent pixel electrodes. Since the pattern film is made of a metallic film of aluminum or the like, it has high light-shielding property, and thus permits light control from the incident light side of the semiconductor layer 1, preventing the occurrence of error in the operation of the TFTs.

Although, in this embodiment, the pattern film 6b is formed in the same layer of the same material as the data lines, the pattern film 6b may be formed of another material or layer as long as the pattern film 6b is arranged below the pixel electrodes to form desired steps in the surface of the TFT array substrate 200, which contacts the liquid crystal layer 50, in the completed liquid crystal device.

Although, in this embodiment, the pattern film 6b has a concave shape, it may have a rectangular shape in which the center is hollowed out to remove only a portion corresponding to each of the contact holes, and the shape of the pattern film 6b is not limited to these shapes.

Although, in this embodiment, the pattern film 6b is in an island-like floating state, the pattern film 6b may be connected to the data lines as long as the data lines are not electrically connected to each other.

In this embodiment, there is a space between the pattern film 6b and each of the data lines 6. This space is described with reference to FIG. 12. FIG. 12 is an enlarged view of the vicinity of each of the data lines 6, taken along line C–C' of FIG. 1. In some cases, a space is provided between each of the data lines 6 and the pattern film 6b so that the data lines 6 are not electrically connected to each other. In this case, the distance 71 between each of the data lines 6 and the pattern film 6b is not more than twice as long as the thickness of the insulating film provided thereon, preferably not more than 1.8 times as long as the thickness, so that the amount of sinking 72 of the interlayer insulating film 7 can be significantly decreased by coverage of the interlayer insulating film 7. Therefore, the steps formed between the pattern film 6b and the data lines 6 can prevent the occurrence of orientation defects.

In this embodiment, in some cases, the occurrence of transverse electric fields on the data line side (the regions along the data lines) and the scanning line side (the regions along the scanning lines) depends upon the circuit driving method. In this case, the thickness of the pattern film 6b or the data lines 6 is changed to easily control the occurrence of the transverse electric field. The structures suitable for some circuit driving methods are described below with reference to FIGS. 13, 14, and 15. Each of FIGS. 13 to 15 is a sectional view taken along line C–C' of FIG. 1.

FIG. 13 is a drawing illustrating a structure suitable for a case in which the transverse electric field of the same magnitude is applied to the data line side and the scanning line side. A driving method for applying the transverse electric field of the same magnitude to the data line side and the scanning line side is dot reversal in which polarity is reversed between adjacent pixels. In this case, as shown in FIG. 13, with the same transverse electric field applied, the data lines 6 and the pattern film 6b have substantially the same thickness to form the same step on the data line side and the scanning line side at the edges of each of the pixel electrodes 9a. Therefore, the edges on the scanning line side and the data line side have a constant height over the entire pixel electrodes 9a. This can prevent orientation defects due to the transverse electric field on both the scanning line side and the data line side.

FIG. 14 is a drawing illustrating a structure suitable for a case in which the transverse electric field applied to the data line side is higher than that applied to the scanning line side. A driving method for applying a higher transverse electric field to the data line side than to the scanning line side is column reversal in which polarity is reversed between adjacent pixel columns. In this case, the thickness of the data lines 6 is set to be greater than that of the pattern film 6b. For example, with the pattern film 6b having a thickness of 300 nm, the thickness of the data lines 6 can be set to 500 to 800 nm. Even when a higher transverse electric field is produced on the data line side, therefore, the edges on both the scanning line side and the data line side are at a constant height, preventing orientation defects due to the transverse electric field.

At the same time, the edges on the data line side are higher than the edges on the scanning line side to prevent orientation defects due to the higher transverse electric field produced on the data line side.

Although not limited to this structure, for example, lower layer wiring 61 of the data lines may be made of the same material Al as the pattern film 6b, or an alloy thereof, and upper layer wiring 62 of the data lines may be made of a high-melting-point metal such as Ti, Ta, W, an alloy thereof, or a silicide thereof. In this case, the upper layer wiring can be used as an anti-reflecting film in pattering, and a barrier metal in terminal connection.

In this structure, for example, the lower wiring 61 of the data lines may be made of the same high-melting-point metal as the pattern film 6b, such as Ti, Ta, W, or the like, an alloy thereof, or a silicide thereof, and the upper layer wiring 62 of the data lines may be made of Al, or an alloy thereof. In this case, the pattern film 6b can be used as a barrier metal between the pixel electrodes 9a and the capacitance electrodes 1f.

FIG. 15 is a drawing illustrating a structure for a case when a higher transverse electric field is applied to the scanning line side than to the data line side. A driving method for applying a higher transverse electric field to the scanning line side than to the data line side is line reversal in which polarity is reversed between adjacent pixel lines. In this case, the thickness of the pattern film 6b is set to be greater than that of the data lines 6. For example, with the data lines 6 having a thickness of 300 nm, the thickness of the pattern film 6b can be set to 500 to 800 nm. Even when a higher transverse electric field is produced on the scanning line side, therefore, the edges on both the scanning line side and the data line side are at a constant height, preventing orientation defects due to the transverse electric field. At the same time, the edges on the scanning line side are higher than those on the data line side, preventing orientation defects due to the higher transverse electric field on the data line side.

Although not limited to this structure, for example, the lower layer side 61' of the pattern film 6b may be made of the same material Al as the data lines 6, or an alloy thereof, and the upper layer side 62' of the pattern film 6b may be made of a high-melting-point metal such as Ti, Ta, W, an alloy thereof, or a silicide thereof. In this case, the upper layer side 62' can be used as an anti-reflecting film in pattering, and a barrier metal between the pixel electrodes 9a and the capacitance electrodes 1f.

Although the liquid crystal device of this embodiment is not provided with a color filter, a color filter may be provided on the liquid crystal device. In this case, the liquid crystal device of this embodiment can be applied to a color liquid crystal device such as a direct-viewing type or reflective liquid crystal color television other than a liquid crystal projector. Furthermore, a microlens may be formed on the counter substrate corresponding to each of the pixels. This can improve the condensing efficiency of incident light to realize a bright liquid crystal device. Furthermore, a plurality of interference layers having different refractive indexes may be deposited on the counter substrate 300 to form a dichroic filter which creates RGB colors by using light interference. This counter substrate provided with the dichroic filter can realize a brighter liquid crystal device.

Although polysilicon TFT is used as the switching element provided on each of the pixels, other types of TFT such as amorphous silicon TFT also can be used.

B. Second Embodiment

The second embodiment is next described with reference to FIGS. 16 to 18. FIG. 16 is a plan view showing a plurality of adjacent pixel groups on a TFT array substrate on which data lines, scanning lines, pixel electrodes, light shielding films, etc. are formed in accordance with the second embodiment. FIG. 17 is an enlarged view showing a portion of FIG. 16. FIG. 18 is a sectional view taken along lines A–A', B–B', and C–C' in FIG. 16. In the second embodiment, the same contents as the first to embodiment are not described, and only different portions are described below.

In FIG. 16, a plurality of transparent pixel electrodes 9a are formed in a matrix on the TFT array substrate of an electro-optical device corresponding to respective pixels. The formation region of the pixel electrodes 9a is a rectangular region shown by oblique lines in an enlarged view of FIG. 17.

In addition, data lines 6 and scanning lines 3 are formed along the boundary regions between the adjacent pixel electrodes 9a. Both sides of each of the data lines 6 overlap the edges of the corresponding pixel electrodes 9a, and both sides of each of the scanning lines 3 also overlap the edges of the corresponding pixel electrodes 9a.

In the present embodiment, the data lines 6 (source electrodes) are formed of a metal film such as aluminum or a alloy film such as metal silicide.

Furthermore, contact holes 5 connected to high-concentration source regions 1d, and contact holes 84 connected to high-concentration drain regions 1e are formed in layers above the scanning lines 3 (gate electrodes 3a) and a gate insulating film 2 (for example, a thermal oxidation film 2a and a HTO film 2b), respectively. A second interlayer insulating film 7a is formed on a first interlayer insulating film 4, the second interlayer insulating film 7a being planarized. A third interlayer insulating film 7b is formed on the second interlayer insulating film 7a. The data lines 6 are formed on the second interlayer insulating film 7a, and electrically connected to the high-concentration source regions 1d through the contact holes 5 connected to the source regions 1d.

Like in the first embodiment, in this embodiment, a pattern film 6b formed in the same layer as the data lines is formed at positions shown by net lines in FIGS. 16 and 17, i.e., formed on the scanning lines 3.

The pixel electrodes 9a are formed on the third interlayer insulating film 7b. In this embodiment, in order to electrically connect the pixel electrodes 9a to the high-concentration drain regions 1e of TFTs 30, drain electrodes 17 are formed on the surface of the first interlayer insulating film 4 so as to be electrically connected to the high-concentration drain regions 1e of the TFTs 30 through contact holes 84 of the first interlayer insulating film 4, and contact holes 85 are formed in the second and third interlayer insulating films 7a and 7b so that the pixel electrodes 9a are electrically connected to the drain electrodes 17 through the contact holes 85. Therefore, the pixel electrodes 9a are electrically connected to the high-concentration drain regions 1e of the TFTs 30 through the drain electrodes 17.

In this embodiment, each of the drain electrodes 17 is a light-shielding conductive film such as a doped silicon film (polysilicon junction electrode) formed on the high-concentration drain region 1e to completely cover the upper side of the channel region 1a. The formation region of each of the drain electrodes 17 is formed for each of the pixels in a cross shape along the data line 6a and the scanning line 3a from each of the intersections of the data lines 6a and the scanning lines 3a in the boundary regions of each of the pixel electrodes 9a.

In this embodiment, a thin insulating film 18 is formed on the surface side of the drain electrodes 17, and a second light shielding film 19 is formed between the thin insulating film 18 and the second interlayer insulating film 7a to cover the channel regions 1a' of the TFTs 30. In this embodiment, the second light shielding film 19 is a metal such as Ti, Cr, W, Ta, Mo, Pb, or Al, an alloy thereof, a silicide thereof, or a light-shielding conductive film of doped silicon, or the like. The second light shielding film 19 is formed in a lattice shape along the boundary regions of the pixel electrodes 9a and is maintained at a potential common to all pixels.

The drain electrodes. 17 are formed below the second light shielding film 19 so as to be opposed to the second light shielding film 19 with the thin insulating film provided therebetween over a wide region. In this embodiment, the thin film insulating film 18 is used as a dielectric film, and the second light shielding film 19 and the drain electrodes 17 are used as electrodes to form storage capacitors 70.

In the construction of this embodiment, like in the first embodiment, the pattern film 6b is arranged in the regions between the adjacent pixel electrodes between the adjacent data lines 6, thereby obtaining a high-quality liquid crystal device having no defective orientation display region due to the transverse electric field produced between the adjacent pixel electrodes. Since the pattern film 6b is a metallic film of aluminum or the like, it has an excellent light shielding property. Particularly, when the second light shielding film made of silicide or the like does not function as a complete light shielding film, the pattern film 6b is overlapped with the second light shielding film to securely improve the light shielding property.

Description will now be made of a case in which the liquid crystal device of each of the above embodiments is used as a light valve of a color liquid crystal projector (projector).

In a projector, three light crystal devices are respectively used as RGB light valves so that incident light of each color separated through each of RGB color separation dichroic mirrors is incident on each panel. The construction of a projector is described below with reference to FIG. 9. FIG. 9 schematically shows the construction of an optical system of a projector 1100 having the three above-described liquid crystal devices including RGB liquid crystal devices 962R, 962G and 962B. The optical system of this projector includes a light source device 920, and a uniform illumination optical system 923. The projector further includes, a color separation optical system 924 which functions to separate a light flux W emitted from the uniform illumination optical system 923 into red (R), green (G) and B (blue), three light valves, 925R, 925G and 925B which function to respectively modulate the R, G, B light fluxes, a color synthesis prism 910 which functions to re-synthesize the modulated color light fluxes and a projection lens unit 906 that functions to enlarge and project the synthesized light flux on the surface of a projection screen 100. The projector 1100 also has a light guide system 927 for guiding blue light flux B to the corresponding light valve 925B.

The uniform illumination optical system 923 includes two lens plates 921 and 922, and a reflecting mirror 931 so that the two lens plates 921 and 922 cross each other at right angles with the reflecting mirror 931 provided therebetween. Each of the two lens plates 921 and 922 of the uniform illumination optical system 923 includes a plurality of rectangular lenses arranged in a matrix. The light flux emitted from the light source device 920 is divided into a plurality of light flux parts by the rectangular lenses of the first lens plate 921. These light flux parts are superposed by the second lens plate 922 near the three light valves 925R, 925G, and 925B. Therefore, by using the uniform illumination optical system 923, the three light valves 925, 925G, and 925B can be illuminated with uniform illumination light even when the light flux emitted from the light source device 920 has a non-uniform illumination distribution.

The color separation optical system 924 includes a blue-green reflecting dichroic mirror 941, a green reflecting dichroic mirror 942, and a reflecting mirror 943. The blue-green reflecting dichroic mirror 941 reflects at a right angle, blue light flux B and green light flux G, contained in the light flux W, toward the green reflecting dichroic mirror 942. The red light flux R passes through the mirror 941, and is reflected at a right angle by the reflective mirror 943 to be emitted to the prism unit 910 from the outgoing portion 944 for the red light flux R.

Then, only the green light flux G, of the blue and green light fluxes B and G, reflected by the blue-green reflecting dichroic mirror 941 is reflected at a right angle by the green reflecting dichroic mirror 942 to be emitted to the color synthesis optical system from the outgoing portion 945 for green light flux G. The blue light flux B passing through the green reflecting dichroic mirror 942, is emitted to the light guide system 927 from the outgoing portion for blue light flux B. In this example, the distances between the outgoing portion for light flux W of the uniform illumination optical system and the outgoing portions 944, 945 and 946, for respective color light fluxes in the color separation optical system 924, are set to be substantially the same.

Condensing lenses 951 and 952 are respectively provided on the outgoing sides of the outgoing portions 944 and 945 for red and green light fluxes R and G in the color separation optical system 924. Therefore, the red and green light fluxes R and G emitted from the outgoing portions are incident on the condensing lenses 951 and 952 to be collimated.

The collimated red and green light fluxes R and G are incident on the light valves 925R and 925G, respectively, to add image information corresponding to each color. Namely, the liquid crystal devices are controlled to be switched by driving circuitry not shown in the drawings, according to image information so that each color light passing through the liquid crystal device is modulated. On the other hand, blue light flux B is guided to the corresponding light valve 925B through the light guide system 927, and modulated thereby according to image information. The light valves 925R, 925G, and 925B further include incident side polarizers 960R, 960G, and 960B, outgoing side polarizers 961R, 961G, and 961B, and the liquid crystal devices 962R, 962G, and 962B provided therebetween, respectively.

The light guide system 927 includes a condensing lens 954 arranged on the outgoing side of the outgoing portion 946 of blue light flux B, an incident side reflecting mirror 971, an outgoing side reflecting mirror 972, an intermediate lens 973 arranged between these reflecting mirrors, and a condensing lens 953 arranged at the near end of the light valve 925B. The blue flux B emitted from the condensing lens 946 is guided to the liquid crystal device 962B through the light guide system 927 and is modulated. With respect to the light path length of each of the fluxes, i.e., the distance from the outgoing portion of the flux W and each of the liquid crystal devices 962R, 962G, and 962B, the blue flux B has the longest light path length, and thus has much loss of the quantity of light. However, the loss of the quality of light can be suppressed by interposing the light guide system 927.

The fluxes R, G, and B modulated through the light valves 925R, 925G, and 925B, respectively, are incident on the color synthesis prism 910, and synthesized therein. The light synthesized by the color synthesis prism 910 is enlarged and projected on the surface of the projection screen 100 at the predetermined position through the projection lens unit 906.

In this example, particularly, an inorganic film is used as an interlayer insulating film of the liquid crystal device serving as the blue light valve 962B, and thus the interlayer insulating film does not deteriorate due to the blue flux B, thereby obtaining a high-quality projector.

As described above, in the liquid crystal device used as a blue light valve, which requires a planarized inorganic film for preventing optical deterioration of a film, the pattern film is used for facilitating control of the distance between the edges of the pixel electrodes and the counter electrode, thereby preventing orientation defects of liquid crystal molecules due to the transverse electric field produced between the adjacent pixel electrodes. Therefore, the liquid crystal device is particularly effective for use as a blue light valve.

While the invention has been described with reference to preferred embodiments thereof, it is to be understood that the invention is not limited to the preferred embodiments or constructions. On the contrary, the invention is intended to cover various modifications and equivalent arrangements. In addition, while the various elements of the invention are shown in various combinations and configurations which are exemplary, other combinations and configurations, including more, less or only a single element, are also within the spirit and scope of the invention.

What is claimed is:

1. A liquid crystal device comprising:

first and second substrates;

a liquid crystal layer held between the first and second substrates;

a counter electrode provided on the first substrate;

pixel electrodes arranged in a matrix, switching elements respectively connected to the pixel electrodes, a lower interlayer insulating surface including a planarized film and arranged on the switching elements, data lines arranged on the lower interlayer insulating surface, and an upper interlayer insulating film arranged on the data lines and below the pixel electrodes, all of which are provided on the second substrate; and a pattern film provided on the lower interlayer insulating surface and below the pixel electrodes and forming a step on a surface of the upper interlayer insulating film so as to be located in regions between adjacent pixel electrodes arranged along the data lines.

2. A projector comprising a light source, at least one liquid crystal light valve that modulates incident light emitted from the light source according to image information, and a projection lens that projects light modulated by the liquid crystal light valve;

wherein the at least one liquid crystal light valve comprises the liquid crystal device according to claim 1.

3. The liquid crystal device according to claim 1, wherein the pattern film comprises the same film as the data lines.

4. A projector comprising a light source, at least one liquid crystal light valve that modulates incident light emitted from the light source according to image information, and a projection lens that projects light modulated by the liquid crystal light valve;

wherein the at least one liquid crystal light valve comprises the liquid crystal device according to claim 3.

5. The liquid crystal device according to claim 1, wherein a width of each of the regions between the adjacent pixel electrodes is longer than a distance between an end of each of the pixel electrodes and the counter electrode in the vicinity of each of the regions between the adjacent pixel electrodes.

6. The liquid crystal device according to claim 5, wherein a distance between the pattern film and each of the data lines is not more than twice as long as a thickness of the upper interlayer insulating film.

7. The liquid crystal device according to claim 1, wherein edges of the pixel electrodes overlap the pattern film.

8. The method of manufacturing a liquid crystal device according to claim 1, further comprising the steps of:

forming a lower interlayer insulating film having the planarized surface;

simultaneously forming the data lines and the pattern film on the lower interlayer insulating film; and forming the upper interlayer insulating film to cover the data lines and the pattern film.

9. The liquid crystal device according to claim 5, wherein the pattern film comprises the same layer as the data lines.

10. A liquid crystal device comprising:

first and second substrates;

a liquid crystal layer held between the first and second substrates;

a counter electrode provided on the first substrate; and a plurality of scanning lines and a plurality of data lines arranged to intersect each other, an upper interlayer insulating film arranged to cover the scanning lines and the data lines, a plurality of pixel electrodes respectively arranged at intersections of the scanning lines and the data lines in a matrix on the upper interlayer insulating film, and a pattern film arranged on a planarized surface and below the upper interlayer insulating film and forming a step on a surface of the upper layer interlayer insulating film so as to be located in regions between adjacent pixel electrodes arranged along the data lines or the scanning lines, all of which are provided on the second substrate.

11. The liquid crystal device according to claim 10, wherein edges of the pixel electrodes overlap the pattern film.

12. The liquid crystal device according to claim 11, wherein a planarized lower interlayer insulating film covers the scanning lines so that the data lines and the pattern film are arranged on the lower interlayer insulating film, the pattern film is arranged to cover at least portions of the scanning lines, and the upper interlayer insulating film is arranged to cover the data lines and the pattern film.

13. A projector comprising a light source, at least one liquid crystal light valve that modulates incident light emitted from the light source according to image information, and a projection lens that projects light modulated by the liquid crystal light valve;

wherein the liquid crystal light valve comprises the liquid crystal device according to claim 10.

14. The liquid crystal device according to claim 10, wherein the pattern film comprises the same layer as the data lines.

15. A projector comprising a light source, at least one liquid crystal light valve that modulates incident light emitted from the light source according to image information, and a projection lens that projects light modulated by the liquid crystal light valve;

wherein the liquid crystal light valve comprises the liquid crystal device according to claim 14.

16. The liquid crystal device according to claim 14, wherein the lower interlayer insulating film comprises an inorganic film.

17. The liquid crystal device according to claim 10, wherein a planarized lower interlayer insulating film covers the scanning lines so that the data lines and the pattern film are arranged on the lower interlayer insulating film, the pattern film is arranged to cover at least portions of the scanning lines, and the upper interlayer insulating film is arranged to cover the data lines and the pattern film.

18. A projector comprising a light source, at least one liquid crystal light valve that modulates incident light emitted from the light source according to image information, and a projection lens that projects light modulated by the liquid crystal light valve;

wherein the liquid crystal light valve comprises the liquid crystal device according to claim 11.

19. A projector comprising a light source, at least one liquid crystal light valve that modulates incident light emitted from the light source according to image information, and a projection lens that projects light modulated by the liquid crystal light valve;

wherein the liquid crystal light valve comprises the liquid crystal device according to claim 11.

20. A method of manufacturing a liquid crystal device the method comprising the steps of:

forming a counter electrode on a first substrate to form a counter substrate;

forming a plurality of scanning lines and a plurality of data lines on a second substrate so that the scanning lines and the data lines intersect each other;

forming an upper interlayer insulating film to cover the plurality of scanning lines and data lines;

forming a plurality of pixel electrodes on the upper interlayer insulating film at intersections of the scanning lines and the data lines;

forming a pattern film on a planarized surface and below the upper interlayer insulating film so that the pattern film is located in regions between adjacent pixel electrodes arranged along the data lines or the scanning lines; and arranging the first substrate and the second substrate with a gap therebetween so that the counter electrode is opposed to the pixel electrodes, and inserting a liquid crystal into the gap.

21. A liquid crystal device comprising:

first and second substrates;

a liquid crystal layer held between first the and second substrates;

a counter electrode provided on the first substrate;

pixel electrodes arranged in a matrix, switching elements respectively connected to the pixel electrodes, a lower interlayer insulating film arranged on the switching elements, data lines arranged on the lower interlayer insulating film, an upper interlayer insulating film arranged on the data lines below the pixel electrodes, and a pattern film arranged between the lower and upper interlayer insulating films below the pixel electrodes and located in regions between adjacent pixel electrodes arranged along the scanning lines, all of which are provided on the second substrate; and drain electrodes respectively connected to the switching elements with dielectric films provided therebetween, and a light shielding film, both of which are interposed between the data lines and the scanning lines;

wherein the pattern film overlaps the scanning lines and the light shielding film.

22. The liquid crystal device according to claim 10, wherein a width of each of the regions between the adjacent pixel electrodes is longer than a distance between an end of each of the pixel electrodes and the counter electrode in the vicinity of each of the regions between the adjacent pixel electrodes.

23. The liquid crystal device according to claim 10, wherein a planarized lower interlayer insulating film covers the scanning lines so that the data lines and the pattern film are arranged on the lower interlayer insulating film, the pattern film is arranged to cover at least portions of the scanning lines, and the upper interlayer insulating film is arranged to cover the data lines and the pattern film.

24. A projector comprising a light source, at least one liquid crystal light valve that modulates incident light emitted from the light source according to image information, and a projection lens that projects light modulated by the liquid crystal light valve;

wherein the liquid crystal light valve comprises the liquid crystal device according to claim 23.

25. A liquid crystal device comprising:

first and second substrates;

a liquid crystal layer held between the first and second substrates;

a counter electrode provided on the first substrate;

pixel electrodes arranged in a matrix, switching elements respectively connected to the pixel electrodes, a lower interlayer insulating surface including a planarized film and arranged on the switching elements, data lines arranged on the lower interlayer insulating surface, and an upper interlayer insulating film arranged on the data lines and below the pixel electrodes, all of which are provided on the second substrate; and a pattern film provided on the lower interlayer insulating surface and below the pixel electrodes so as to be located in regions between adjacent pixel electrodes arranged along the data lines; and wherein a width of each of the regions between the adjacent pixel electrodes is longer than a distance between an end of each of the pixel electrodes and the counter electrode in the vicinity of each of the regions between the adjacent pixel electrodes.

26. The liquid crystal device according to claim 25, wherein a distance between the pattern film and each of the data lines is not more than twice as long as a thickness of the upper interlayer insulating film.

27. The liquid crystal device according to claim 25, wherein the pattern film comprises the same layer as the data lines.

28. A liquid crystal device comprising:

first and second substrates;

a liquid crystal layer held between the first and second substrates;

a counter electrode provided on the first substrate; and a plurality of scanning lines and a plurality of data lines arranged to intersect each other, an upper interlayer insulating film arranged to cover the scanning lines and the data lines, a plurality of pixel electrodes respectively arranged at intersections of the scanning lines and the data lines in a matrix on the upper interlayer insulating film, and a pattern film arranged on a planarized surface and below the upper interlayer insulating film so as to be located in regions between adjacent pixel electrodes arranged along the data lines or the scanning lines, all of which are provided on the second substrate; and wherein a width of each of the regions between the adjacent pixel electrodes is longer than a distance between an end of each of the pixel electrodes and the counter electrode in the vicinity of each of the regions between the adjacent pixel electrodes.

29. The liquid crystal device according to claim 28, wherein a planarized lower interlayer insulating film covers the scanning lines so that the data lines and the pattern film are arranged on the lower interlayer insulating film, the pattern film is arranged to cover at least portions of the scanning lines, and the upper interlayer insulating film is arranged to cover the data lines and the pattern film.

30. A projector comprising a light source, at least one liquid crystal light valve that modulates incident light emitted from the light source according to image information, and a projection lens that projects light modulated by the liquid crystal light valve;

wherein the liquid crystal light valve comprises the liquid crystal device according to claim 28.

* * * * *